(12) United States Patent
Bookbinder et al.

(10) Patent No.: US 11,822,117 B2
(45) Date of Patent: Nov. 21, 2023

(54) PRIMARY COATING COMPOSITIONS WITH IMPROVED MICROBENDING PERFORMANCE

(71) Applicant: CORNING INCORPORATED, Corning, NY (US)

(72) Inventors: Dana Craig Bookbinder, Corning, NY (US); Bin Yang, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 415 days.

(21) Appl. No.: 17/060,307

(22) Filed: Oct. 1, 2020

(65) Prior Publication Data

US 2021/0103092 A1 Apr. 8, 2021

Related U.S. Application Data

(60) Provisional application No. 62/912,366, filed on Oct. 8, 2019.

(51) Int. Cl.
| | |
|---|---|
| *G02B 6/02* | (2006.01) |
| *C09D 175/16* | (2006.01) |
| *C09D 7/63* | (2018.01) |
| *C08G 18/38* | (2006.01) |
| *C08G 18/10* | (2006.01) |
| *C08G 18/32* | (2006.01) |
| *C08G 18/75* | (2006.01) |

(52) U.S. Cl.
CPC ......... *G02B 6/02395* (2013.01); *C08G 18/10* (2013.01); *C08G 18/3206* (2013.01); *C08G 18/3823* (2013.01); *C08G 18/755* (2013.01); *C08G 18/757* (2013.01); *C09D 7/63* (2018.01); *C09D 175/16* (2013.01)

(58) Field of Classification Search
CPC .... G02B 6/02395; C09D 7/63; C09D 175/16; C08G 18/10; C08G 18/3206; C08G 18/3823; C08G 18/755; C08G 18/757
See application file for complete search history.

(56) References Cited

U.S. PATENT DOCUMENTS

| 3,929,731 A | * | 12/1975 | Volkova | C08G 65/002 |
| | | | | 525/518 |
| 4,164,486 A | * | 8/1979 | Kudo | C08G 18/8158 |
| | | | | 522/90 |
| 4,183,796 A | * | 1/1980 | Ansel | C08G 18/4661 |
| | | | | 526/261 |

(Continued)

FOREIGN PATENT DOCUMENTS

| EP | 0539030 A1 | 4/1993 | |
| EP | 1072564 A1 * | 1/2001 | ........... C03C 25/106 |

(Continued)

*Primary Examiner* — Peter Radkowski
(74) *Attorney, Agent, or Firm* — Kevin L. Bray

(57) ABSTRACT

Curable compositions that include an oligomer with one or more internal urethane linkages and OH groups capped by an Acrylate-End-Capping (AEC) compound. The curable compositions may be made by reacting a polyol with a diisocyanate compound to form a pre-oligomer compound having one or more internal urethane linkages and terminal OH groups. The curable coating compositions may be cured to form a coating for an optical fiber, for example, a primary coating for an optical fiber.

14 Claims, 5 Drawing Sheets

(56) References Cited

U.S. PATENT DOCUMENTS

| | | | | |
|---|---|---|---|---|
| 4,233,425 A * | 11/1980 | Tefertiller | ........ | C08G 65/33396 528/69 |
| 4,522,465 A * | 6/1985 | Bishop | ............... | C03C 25/1065 427/520 |
| 4,609,718 A * | 9/1986 | Bishop | ............... | C08G 18/5024 560/25 |
| 4,690,501 A * | 9/1987 | Zimmerman | ...... | C08G 18/5024 428/378 |
| 4,690,502 A * | 9/1987 | Zimmerman | ...... | C08G 18/8175 428/378 |
| 4,690,503 A * | 9/1987 | Janssen | ............... | C03C 25/1065 385/128 |
| 4,707,076 A * | 11/1987 | Skutnik | .............. | G02B 6/02033 385/128 |
| 4,798,852 A * | 1/1989 | Zimmerman | ...... | C08G 18/8175 385/128 |
| 4,877,306 A * | 10/1989 | Kar | .................... | G02B 6/03611 385/128 |
| 4,921,880 A * | 5/1990 | Lee | ...................... | C08K 5/5415 528/901 |
| 5,112,658 A * | 5/1992 | Skutnik | ................... | C03C 17/32 215/12.2 |
| 5,146,531 A * | 9/1992 | Shustack | ............. | C03C 25/1065 522/42 |
| 5,175,231 A * | 12/1992 | Rappoport | ............. | C08G 71/04 528/121 |
| 5,181,268 A * | 1/1993 | Chien | ................... | G02B 6/4402 174/76 |
| 5,257,339 A * | 10/1993 | Darsey | ................... | G02B 6/443 385/128 |
| 5,259,060 A * | 11/1993 | Edward | .............. | G02B 6/02395 385/128 |
| 5,302,627 A * | 4/1994 | Field | ....................... | C09D 4/00 522/42 |
| 5,304,628 A * | 4/1994 | Kinoshita | ........... | C08F 290/064 528/370 |
| 5,320,904 A * | 6/1994 | Mitchell | .............. | G02B 6/4492 385/128 |
| 5,340,889 A * | 8/1994 | Crawford | .............. | C07C 271/20 528/370 |
| 5,373,578 A * | 12/1994 | Parker | ................... | G02B 6/4403 65/432 |
| 5,408,564 A * | 4/1995 | Mills | ....................... | G02B 6/443 427/160 |
| 5,416,880 A * | 5/1995 | Edwards | ............... | C03C 25/326 65/447 |
| 5,442,034 A * | 8/1995 | Primeaux, II | .......... | C08G 18/10 528/68 |
| 5,596,669 A * | 1/1997 | Murphy | .............. | C03C 25/1065 522/90 |
| 5,761,363 A * | 6/1998 | Mills | ................... | G02B 6/4498 385/114 |
| 5,777,053 A * | 7/1998 | McBain | .............. | B29C 37/0028 526/329.2 |
| 5,946,102 A * | 8/1999 | Holcomb | ............... | G01N 21/55 356/417 |
| 5,965,460 A * | 10/1999 | Rach | .................... | C08G 18/672 451/526 |
| 5,993,896 A * | 11/1999 | Unterberger | ............ | C03C 25/12 427/500 |
| 5,995,693 A * | 11/1999 | Yang | ..................... | G02B 6/448 385/114 |
| 6,018,605 A * | 1/2000 | Mills | .................... | G02B 6/4403 385/128 |
| 6,023,547 A * | 2/2000 | Tortorello | ........... | C03C 25/1065 528/65 |
| 6,054,503 A * | 4/2000 | Ichikawa | ............... | C08F 220/62 351/159.01 |
| 6,075,065 A * | 6/2000 | Yamazaki | .............. | C09J 4/06 522/90 |
| 6,085,010 A * | 7/2000 | Zahora | .................. | G02B 6/4482 428/383 |
| 6,120,905 A * | 9/2000 | Figovsky | ............... | C08G 71/04 528/121 |
| 6,171,698 B1 * | 1/2001 | Khudyakov | ........ | C03C 25/1065 524/859 |
| 6,173,102 B1 * | 1/2001 | Suzuki | ............... | G02B 6/02395 385/128 |
| 6,208,790 B1 * | 3/2001 | Zopf | .................... | C03C 25/1065 385/127 |
| 6,218,480 B1 * | 4/2001 | Rappoport | .............. | C08L 63/00 523/402 |
| 6,316,105 B1 * | 11/2001 | Khudyakov | ........... | C03C 25/106 522/182 |
| 6,316,516 B1 * | 11/2001 | Chien | ....................... | C09D 4/06 522/182 |
| 6,362,249 B2 * | 3/2002 | Chawla | ................. | C03C 25/106 522/182 |
| 6,391,936 B1 * | 5/2002 | Noren | ................... | C03C 25/106 525/455 |
| 6,407,198 B1 * | 6/2002 | Figovsky | ............... | C07D 317/36 528/196 |
| 6,470,128 B1 * | 10/2002 | Khudyakov | .............. | C09D 4/00 385/128 |
| 6,472,450 B2 * | 10/2002 | Szum | .................... | C03C 25/106 522/74 |
| 6,483,972 B1 * | 11/2002 | Thompson | ........... | G02B 6/4404 385/114 |
| 6,495,637 B2 * | 12/2002 | Rappoport | ............. | C08G 18/10 528/370 |
| 6,495,653 B1 * | 12/2002 | Kinsho | .................. | C08G 67/04 528/370 |
| 6,496,635 B1 * | 12/2002 | Fabian | ................. | C03C 25/1065 385/128 |
| 6,528,553 B1 * | 3/2003 | Komiya | ............ | C08G 18/289 522/182 |
| 6,563,996 B1 * | 5/2003 | Winningham | ........... | C09D 4/06 385/128 |
| 6,579,914 B1 * | 6/2003 | Gantt | ....................... | C08G 59/68 522/143 |
| 6,584,263 B2 * | 6/2003 | Fewkes | ................. | C03C 25/106 385/128 |
| 6,596,786 B2 * | 7/2003 | Purvis | ................... | C09D 175/16 522/127 |
| 6,627,761 B2 * | 9/2003 | Klein | ..................... | C07C 271/24 549/229 |
| 6,628,875 B2 * | 9/2003 | Baker | ................. | C03C 25/1065 385/128 |
| 6,646,153 B1 * | 11/2003 | Huybrechts | ........... | C08G 18/44 560/158 |
| 6,689,463 B2 * | 2/2004 | Chou | .................... | C03C 25/106 428/394 |
| 6,775,443 B2 * | 8/2004 | Bringuier | ............. | G02B 6/4495 385/100 |
| 6,775,451 B1 * | 8/2004 | Botelho | .................... | C09D 4/00 385/128 |
| 6,849,333 B2 * | 2/2005 | Schissel | ................ | C08G 18/758 522/90 |
| 6,850,681 B2 * | 2/2005 | Lepont | ................... | C03C 25/106 522/170 |
| 6,853,788 B2 * | 2/2005 | Oshio | ................ | C08G 18/4854 385/127 |
| 6,859,600 B2 * | 2/2005 | Khudyakov | ........ | G02B 6/02395 65/529 |
| 6,862,392 B2 * | 3/2005 | Fabian | ................ | C08G 18/758 385/127 |
| 6,904,210 B2 * | 6/2005 | Chandraiah | ........... | G02B 6/4403 385/128 |
| 6,965,719 B2 * | 11/2005 | Aikawa | ............... | G02B 6/0228 385/128 |
| 7,010,205 B2 * | 3/2006 | Fabian | ............... | G02B 6/02395 385/128 |
| 7,010,206 B1 * | 3/2006 | Baker | ................ | G02B 6/02395 385/127 |
| 7,045,577 B2 * | 5/2006 | Wilkes | ................... | C08G 71/04 528/480 |
| 7,050,688 B2 * | 5/2006 | Lochkovic | ........... | G02B 6/4433 385/128 |

(56) References Cited

U.S. PATENT DOCUMENTS

| | | | | |
|---|---|---|---|---|
| 7,067,564 | B2* | 6/2006 | Bulters | C08G 18/672 427/508 |
| 7,068,902 | B2* | 6/2006 | Gantt | C03C 25/106 385/127 |
| 7,076,142 | B2* | 7/2006 | Bishop | G01N 3/18 385/128 |
| 7,151,879 | B2* | 12/2006 | Ishikawa | G02B 6/4403 385/114 |
| 7,207,732 | B2* | 4/2007 | Fabian | C08G 18/7621 385/127 |
| 7,232,877 | B2* | 6/2007 | Figovsky | C07D 303/32 528/421 |
| 7,496,261 | B2* | 2/2009 | Aikawa | G02B 6/03627 385/127 |
| 7,689,080 | B2* | 3/2010 | Inaba | G02B 6/4436 385/102 |
| 7,706,659 | B2* | 4/2010 | Bulters | G02B 6/02395 522/182 |
| 7,715,675 | B2* | 5/2010 | Fabian | G02B 6/4403 385/100 |
| 7,727,595 | B2* | 6/2010 | Gordon | C08L 63/04 427/386 |
| 7,750,060 | B2* | 7/2010 | Zahora | C08G 18/4238 427/508 |
| 7,767,728 | B2* | 8/2010 | Lu | C09D 151/003 522/178 |
| 7,807,012 | B2* | 10/2010 | Gordon | C09J 183/06 156/321 |
| 7,865,055 | B2* | 1/2011 | Bulters | C03C 25/1065 522/182 |
| 7,886,612 | B2* | 2/2011 | Bulters | C03C 25/1065 73/826 |
| 7,915,323 | B2* | 3/2011 | Awasthi | C08F 30/08 526/263 |
| 7,994,356 | B2* | 8/2011 | Awasthi | C07F 7/0838 556/439 |
| 8,017,719 | B2* | 9/2011 | Bernard | C08G 71/04 528/370 |
| 8,093,322 | B2* | 1/2012 | Hancock, Jr. | C09D 175/16 524/196 |
| 8,114,520 | B2* | 2/2012 | Wakayama | C09J 7/25 219/121.72 |
| 8,143,346 | B2* | 3/2012 | Diakoumakos | C08G 71/04 524/700 |
| RE43,480 | E* | 6/2012 | Fabian | C03C 25/106 385/127 |
| 8,367,157 | B2* | 2/2013 | Fallais | C09D 175/16 528/65 |
| 8,420,711 | B2* | 4/2013 | Awasthi | G02B 1/043 526/306 |
| 8,426,020 | B2* | 4/2013 | Schmid | C09D 5/002 522/12 |
| 8,426,021 | B2* | 4/2013 | Cattron | G02B 1/12 522/182 |
| 8,450,413 | B2* | 5/2013 | Diakoumakos | C08G 71/04 524/700 |
| 8,604,091 | B2* | 12/2013 | Olang | C08G 18/305 521/76 |
| 8,731,366 | B2* | 5/2014 | Wu | C03C 25/1065 427/508 |
| 8,734,945 | B2* | 5/2014 | Cattron | C09D 175/16 522/182 |
| 8,827,447 | B2* | 9/2014 | Awasthi | C08G 77/50 351/159.01 |
| 8,923,681 | B2* | 12/2014 | Namazue | G02B 6/10 65/447 |
| 9,039,174 | B2* | 5/2015 | Awasthi | C08G 77/50 526/279 |
| 9,062,160 | B1* | 6/2015 | Chan | C08G 73/02 |
| 9,096,464 | B2* | 8/2015 | Okada | C03C 25/1065 |
| 9,102,829 | B2* | 8/2015 | Birukov | C08L 75/04 |
| 9,250,387 | B2* | 2/2016 | Sakabe | G02B 6/443 |
| 9,322,991 | B2* | 4/2016 | Bookbinder | G02B 1/12 |
| 9,389,336 | B2* | 7/2016 | Shrestha | G02B 1/043 |
| 9,399,242 | B2* | 7/2016 | Hwuang | D06M 10/001 |
| 9,416,227 | B2* | 8/2016 | Uruno | C08G 71/04 |
| 9,442,264 | B1* | 9/2016 | Cheatle | G02B 6/443 |
| 9,487,662 | B1* | 11/2016 | Figovsky | C09D 4/00 |
| 9,540,537 | B2* | 1/2017 | Takahashi | C09D 175/04 |
| 9,688,574 | B2* | 6/2017 | Baker | G02B 6/02395 |
| 9,695,331 | B2* | 7/2017 | Horgan | C07F 7/1804 |
| 9,810,838 | B2* | 11/2017 | Chen | C08G 18/672 |
| 9,891,379 | B2* | 2/2018 | Bookbinder | C03C 25/285 |
| 10,007,078 | B2* | 6/2018 | Sato | G02B 6/4403 |
| 10,048,436 | B2* | 8/2018 | Homma | C08G 18/755 |
| 10,221,274 | B2* | 3/2019 | Brennan | C08F 290/067 |
| 10,227,502 | B2* | 3/2019 | Chasser | C08G 64/1608 |
| 10,358,577 | B2* | 7/2019 | Homma | C03C 25/326 |
| 10,509,161 | B2* | 12/2019 | Shimada | C03C 25/1065 |
| 10,640,654 | B2* | 5/2020 | DeRosa | B29D 11/00663 |
| 10,707,531 | B1* | 7/2020 | Harrup | C07F 9/65815 |
| 10,731,034 | B2* | 8/2020 | Hsueh | C08L 75/12 |
| 11,028,214 | B2* | 6/2021 | Chen | C08G 18/711 |
| 2001/0008924 | A1* | 7/2001 | Rappoport | C08G 59/1494 525/459 |
| 2002/0146225 | A1* | 10/2002 | Bulters | C08G 18/8175 385/125 |
| 2002/0183474 | A1* | 12/2002 | Klein | C07D 317/36 558/276 |
| 2003/0049446 | A1* | 3/2003 | Schissel | C09D 175/16 428/375 |
| 2003/0077059 | A1* | 4/2003 | Chien | C03C 25/106 385/128 |
| 2003/0113091 | A1* | 6/2003 | Chou | G02B 6/4403 385/144 |
| 2003/0133679 | A1* | 7/2003 | Murphy | C03C 25/106 385/128 |
| 2003/0210879 | A1* | 11/2003 | Oshio | C08G 18/672 385/128 |
| 2003/0215196 | A1* | 11/2003 | Bulters | G02B 6/02395 385/100 |
| 2004/0192803 | A1* | 9/2004 | Figovsky | C07D 303/32 528/421 |
| 2004/0230009 | A1* | 11/2004 | Wilkes | C11C 3/00 525/327.3 |
| 2005/0031283 | A1* | 2/2005 | Fabian | G02B 6/02395 385/128 |
| 2006/0062539 | A1* | 3/2006 | Bulters | G02B 6/02395 427/508 |
| 2006/0105169 | A1* | 5/2006 | Greer | C03C 25/106 428/375 |
| 2007/0049671 | A1* | 3/2007 | Finch | C08L 93/04 524/270 |
| 2007/0100039 | A1* | 5/2007 | Hancock | C08G 18/2825 524/186 |
| 2007/0135588 | A1* | 6/2007 | Diakoumakos | C08G 71/04 525/528 |
| 2008/0190904 | A1* | 8/2008 | Wakayama | C09J 7/25 219/121.72 |
| 2009/0312502 | A1* | 12/2009 | Bernard | C09D 175/12 525/458 |
| 2010/0058877 | A1* | 3/2010 | Bulters | G02B 6/02395 73/826 |
| 2010/0158469 | A1* | 6/2010 | Bulters | G02B 6/02395 427/513 |
| 2010/0204370 | A1* | 8/2010 | Mader | C08K 5/5317 524/99 |
| 2011/0009519 | A1* | 1/2011 | Awasthi | C08F 226/08 523/107 |
| 2011/0009587 | A1* | 1/2011 | Awasthi | G02B 1/043 526/279 |
| 2011/0009658 | A1* | 1/2011 | Awasthi | C07F 7/0838 556/419 |
| 2012/0016050 | A1* | 1/2012 | Leon | C08G 18/4277 522/96 |
| 2012/0059076 | A1* | 3/2012 | Olang | B29C 44/3442 521/76 |
| 2012/0149842 | A1* | 6/2012 | Diakoumakos | C08G 71/04 977/773 |

(56) References Cited

U.S. PATENT DOCUMENTS

| | | | | |
|---|---|---|---|---|
| 2012/0208967 | A1* | 8/2012 | Birukov | C08L 75/04 525/526 |
| 2013/0197125 | A1* | 8/2013 | Awasthi | C08L 83/04 523/107 |
| 2013/0243948 | A1* | 9/2013 | Baker | G02B 6/02395 427/162 |
| 2013/0266815 | A1* | 10/2013 | Horgan | C09D 133/14 428/447 |
| 2013/0289294 | A1* | 10/2013 | Awasthi | C08F 30/08 556/419 |
| 2013/0323491 | A1* | 12/2013 | Takahashi | C09D 175/12 428/339 |
| 2014/0030526 | A1* | 1/2014 | Uruno | C08G 71/04 528/370 |
| 2014/0034519 | A1* | 2/2014 | Shrestha | G02B 1/043 523/108 |
| 2014/0079367 | A1* | 3/2014 | Wu | C08G 18/672 385/141 |
| 2014/0242292 | A1* | 8/2014 | Hwuang | B05D 1/18 427/512 |
| 2015/0071595 | A1* | 3/2015 | Chen | C08G 18/758 522/90 |
| 2016/0046834 | A1* | 2/2016 | Chasser | C09D 169/00 528/370 |
| 2017/0146732 | A1* | 5/2017 | Botelho | G02B 6/02395 |
| 2017/0152338 | A1* | 6/2017 | Brennan | C08F 220/68 |
| 2017/0158862 | A1* | 6/2017 | DeRosa | G02B 6/02395 |
| 2018/0127593 | A1* | 5/2018 | Chen | C08G 18/672 |
| 2018/0163075 | A1* | 6/2018 | Ren | C09D 133/10 |
| 2019/0127605 | A1* | 5/2019 | Homma | C03C 25/285 |
| 2019/0185668 | A1* | 6/2019 | Hsueh | C08K 5/1515 |
| 2019/0225732 | A1* | 7/2019 | Chen | C08G 18/8116 |
| 2021/0294029 | A1* | 9/2021 | Bickham | G02B 6/0365 |

FOREIGN PATENT DOCUMENTS

| | | | | |
|---|---|---|---|---|
| EP | 1172391 | A1 * | 1/2002 | C03C 25/106 |
| EP | 1209132 | A1 * | 5/2002 | C03C 25/106 |
| EP | 1227351 | A2 * | 7/2002 | G02B 6/4495 |
| EP | 1274662 | B1 * | 9/2015 | C03C 25/106 |
| FR | 2867184 | A1 * | 9/2005 | C03C 25/1065 |
| JP | 2017062431 | A * | 3/2017 | G02B 6/4403 |
| WO | WO-02098945 | A1 * | 12/2002 | C03C 25/106 |
| WO | WO-2019021814 | A1 * | 1/2019 | B32B 27/36 |

\* cited by examiner

PRIMARY COATING COMPOSITIONS WITH IMPROVED MICROBENDING PERFORMANCE

BACKGROUND OF THE INVENTION

This Application claims priority under 35 USC § 119(e) from U.S. Provisional Patent Application Ser. No. 62/912,366, filed on Oct. 8, 2019, and which is incorporated by reference herein in its entirety.

FIELD

The present application pertains to novel oligomers, methods of making the oligomers, coating compositions including the oligomers, and cured products of coating compositions that include the oligomers. In particular, the present application pertains to coating compositions for optical fibers made of a cured coating composition including the oligomers.

BACKGROUND

Optical fibers include a glass fiber surrounded by one or more polymer coatings. The glass fiber is configured as a waveguide that includes a high index central glass core surrounded by a lower index glass cladding. The transmittance of light through an optical fiber is highly dependent on the properties of the coatings applied to the glass fiber. Coatings applied to the glass fiber typically include a primary coating and a secondary coating, where the secondary coating surrounds the primary coating and the primary coating contacts the glass waveguide (core+cladding) portion of the optical fiber. The secondary coating is a higher strength (higher Young's modulus) coating than the primary coating and is designed to protect the glass waveguide from damage caused by abrasion or external forces that arise during processing and handling of the optical fiber. The primary coating is a relatively soft material and is designed to buffer or dissipate stresses that result from forces applied to the outer surface of the secondary coating. Dissipation of stresses within the primary coating can attenuate the stress and minimize the stress that reaches the glass waveguide. In particular, the primary coating can dissipate stresses that arise when the optical fiber is bent. Minimizing the bending stresses transmitted to the glass waveguide can reduce the creation of local perturbations in the refractive index profile of the glass waveguide, which can lead to intensity losses for the light transmitted through the glass waveguide. By dissipating stresses, a primary coating can minimize bend-induced intensity losses.

Accordingly, there is a need for a primary coating material with suitable mechanical properties that is able to reduce microbending loses.

BRIEF SUMMARY

The present disclosure is directed to oligomers having one or more internal urethane linkages. An oligomer according to embodiments disclosed herein may be made by reacting a polyol with a diisocyanate compound to form a pre-oligomer compound having one or more internal urethane linkages and terminal OH groups. The terminal OH groups are then capped to create the oligomer. The oligomers may be incorporated into a curable coating composition that is cured to form a urethane-acrylate coating. The coating may be utilized as a coating for an optical fiber, for example, a primary coating for an optical fiber. The coating made by curing a curable coating composition including an oligomer as described herein have desirable mechanical properties that, among other things, reduce microbending losses for an optical fiber.

A first aspect (1) of the present application is directed to an optical fiber including a core, a cladding and a coating disposed over the cladding, the coating including a cured product of a curable coating composition, the curable coating composition including an oligomer having the following structure:

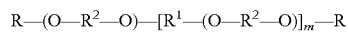

wherein each R is independently selected from the following:

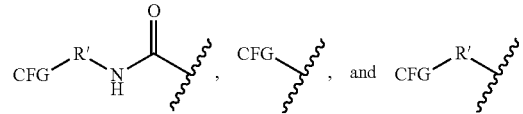

where CFG represents a curable functional group and R' is a divalent organic group and each R1 is independently selected from the following:

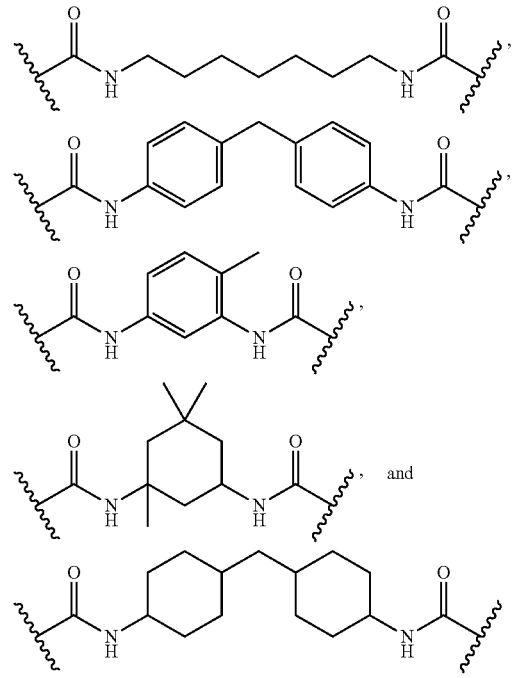

each O—R²—O is independently the residue of a compound HO—R²—OH selected from the group consisting of a polyether polyol, a polypropylene polyol, a polybutadiene polyol, a polycarbonate polyol, a polycaprolactone polyol, an acrylic polyol, and a silicone polyol; and m is greater than 0 and less than 5.

In a second aspect (2), the optical fiber according to the first aspect (1) is provided and the CFG is an ethylenically unsaturated group and R' is a linear or branched organic group with one or more alkylene linkages, ether linkages, ester linkages, amine linkages, or amide linkages.

In a third aspect (3), the optical fiber according to the first aspect (1) is provided and the CFG is an acrylate or methacrylate group.

In a fourth aspect (4), the optical fiber according to any of aspects (1)-(3) is provided and each R is independently selected from the following:

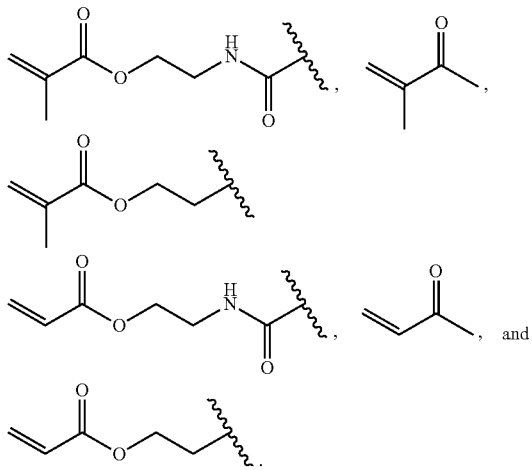

In a fifth aspect (5), the optical fiber according to any of aspects (1)-(4) is provided and $R^2$ has the structure $—R^7—(O—R^7)_x—$ where $R^7$ is a divalent organic group and x is an integer greater than 10.

In a sixth aspect (6), the optical fiber according to any of aspects (1)-(5) is provided and the coating is a primary coating and the coated optical fiber comprises a secondary coating disposed over the primary coating.

In a seventh aspect (7), the optical fiber according to any of aspects (1)-(6) is provided and m is greater than 0 and less than 3.

In an eighth aspect (8), the optical fiber according to any of aspects (1)-(7) is provided and the coating comprises a tear strength of 20 J/m² or more.

In a ninth aspect (9), the optical fiber according to any of aspects (1)-(7) is provided and the coating comprises a tear strength in a range of 20 J/m² to 55 J/m².

In a tenth aspect (10), the optical fiber according to any of aspects (1)-(7) is provided and the coating comprising a tear strength in a range of 30 J/m² to 55 J/m².

In a eleventh aspect (11), the optical fiber according to any of aspects (1)-(10) is provided and the coating comprises a glass transition temperature of −45° C. or less.

In a twelfth aspect (12), the optical fiber according to any of aspects (1)-(10) is provided and the coating comprises a glass transition temperature in a range of −45° C. to −60° C.

In a thirteenth aspect (13), the optical fiber according to any of aspects (1)-(12) is provided and the coating comprises a Young's modulus of 1 MPa or less.

In a fourteenth aspect (14), the optical fiber according to any of aspects (1)-(12) is provided and the coating comprises a Young's modulus in a range of 0.1 MPa to 1 MPa.

In a fifteenth aspect (15), the optical fiber according to any of aspects (1)-(12) is provided and the coating comprises a Young's modulus of 0.6 MPa or less.

In a sixteenth aspect (16), the optical fiber according to any of aspects (1)-(15) is provided and the coating comprises a tensile strength of 0.25 MPa or more.

In a seventeenth aspect (17), the optical fiber according to any of aspects (1)-(16) is provided and the coating comprises a percent elongation of 100% or more.

In a eighteenth aspect (18), the optical fiber according to any of aspects (1)-(16) is provided and the coating comprises a percent elongation of 150% or more.

In a nineteenth aspect (19), the optical fiber according to any of aspects (1)-(16) is provided and the coating comprises a percent elongation in a range of 100% to 200%.

In a twentieth aspect (20), the optical fiber according to any of aspects (1)-(19) is provided and the coating composition further includes a photoinitiator.

In a twenty-first aspect (21), the optical fiber according to any of aspects (1)-(20) is provided and the coating composition further includes one or more monomers having the following structure:

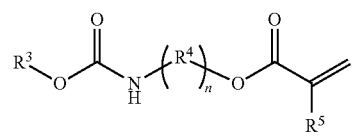

wherein:

$R^3$ is selected from the group consisting of: a linear or branched aliphatic monovalent radical optionally interrupted by one or more oxygen atoms, aryl, or aralkyl;

$R^4$ is selected from the group consisting of: a linear or branched aliphatic divalent radical, a branch aliphatic divalent radical optionally interrupted by one or more oxygen atoms, aryl, or aralkyl;

$R^5$ is selected from hydrogen or alkyl; and n is greater than or equal to 1 and less than or equal to 10.

A twenty-second aspect (22) of the present application is directed to a curable composition for coating an optical fiber, the composition including an oligomer having the following structure:

$$R—(O—R^2—O)—[R1—(O—R^2—O)]_m—R$$

and each R is independently selected from the following:

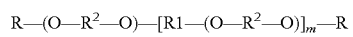

where CFG represents a curable functional group and R' is a divalent organic group; each $R^1$ is independently selected from the following:

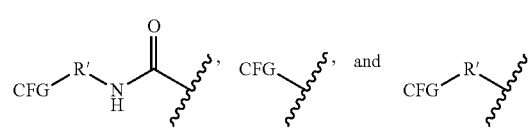

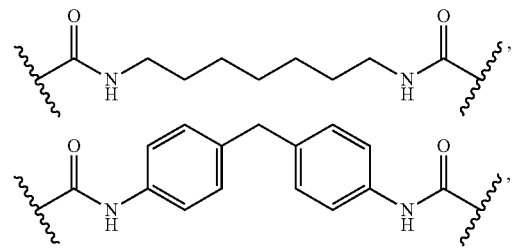

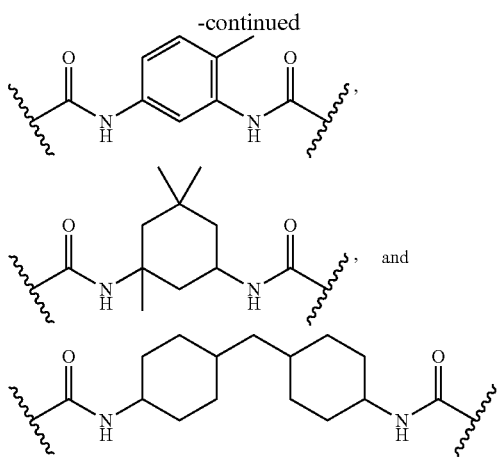

each O—R²—O is independently the residue of a compound HO—R²—OH selected from the group consisting of a polyether polyol, a polypropylene polyol, a polybutadiene polyol, a polycarbonate polyol, a polycaprolactone polyol, an acrylic polyol, and a silicone polyol; and m is greater than 0 and less than 5.

In a twenty-third aspect (23), the curable composition for coating an optical fiber according to the twenty-second aspect (22) is provided and the CFG is an ethylenically unsaturated group and R' is a linear or branched organic group with one or more alkylene linkages, ether linkages, ester linkages, amine linkages, or amide linkages.

In a twenty-fourth aspect (24), the curable composition for coating an optical fiber according to the twenty-second aspect (22) is provided and the CFG is an acrylate or methacrylate group.

In a twenty-fifth aspect (25), the curable composition for coating an optical fiber according to any of aspects (22)-(24) is provided and the curable composition for coating an optical fiber further includes a monomer having the following structure:

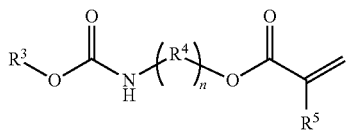

wherein:
R³ is selected from the group consisting of: a linear or branched aliphatic monovalent radical optionally interrupted by one or more oxygen atoms, aryl, or aralkyl;
R⁴ is selected from the group consisting of: a linear or branched aliphatic divalent radical, a branch aliphatic divalent radical optionally interrupted by one or more oxygen atoms, aryl, or aralkyl;
R⁵ is selected from hydrogen or alkyl; and
n is greater than or equal to 1 and less than or equal to 10.

In a twenty-sixth aspect (26), the curable composition for coating an optical fiber according to any of aspects (22)-(25) is provided and the curable composition for coating an optical fiber further includes a photoinitiator.

In a twenty-seventh aspect (27), the curable composition for coating an optical fiber according to any of aspects (22)-(26) is provided and R² has the structure —R⁷—(O—R⁷)ₓ— where R⁷ is a divalent organic group and x is an integer greater than 10.

In a twenty-eighth aspect (28), the curable composition for coating an optical fiber according to any of aspects (22)-(27) is provided and further includes a urethane diacrylate compound comprising O—R²—O.

In a twenty-ninth aspect (29), the curable composition for coating an optical fiber according to the twenty-eighth aspect (28) is provided and a wt % of the urethane diacrylate compound in the curable composition is 5% or more.

In a thirtieth aspect (30), the curable composition for coating an optical fiber according to the twenty-eighth aspect (28) or the twenty-ninth aspect (29) is provided and the urethane diacrylate compound has the structure R—O—R²—O—R and CFG is an acrylate group.

A thirty-first aspect (31) of the present application is directed to a method for making an oligomer. The method includes reacting a polyol with a diisocyanate compound to form a pre-oligomer compound comprising an internal urethane linkage and terminal OH groups; and reacting the pre-oligomer compound with a capping compound comprising a curable functional group and a non-curable functional group, the non-curable functional group reacting with the terminal OH groups of the pre-oligomer compound to form the oligomer, the oligomer having terminal functional groups comprising the curable functional group.

In a thirty-second aspect (32), the method according to the thirty-first aspect (31) is provided and the curable functional group is an ethylenically unsaturated group.

In a thirty-third aspect (33), the method according to the thirty-first aspect (31) is provided and the curable functional group is an acrylate group or a methacrylate group.

In a thirty-fourth aspect (34), the method according to any of aspects (31)-(33) is provided and the non-curable functional group is an isocyanate group.

In a thirty-fifth aspect (35), the method according to any of aspects (31)-(34) is provided and the oligomer has the following structure:

$$R-(O-R^2-O)-[R^1-(O-R^2-O)]_m-R$$

wherein:
each R is independently selected from the following:

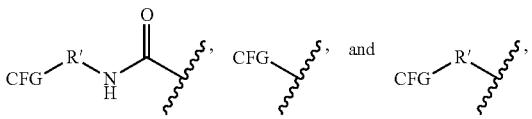

CFG represents the curable functional group and W is a divalent organic group;
each W is independently selected from the following:

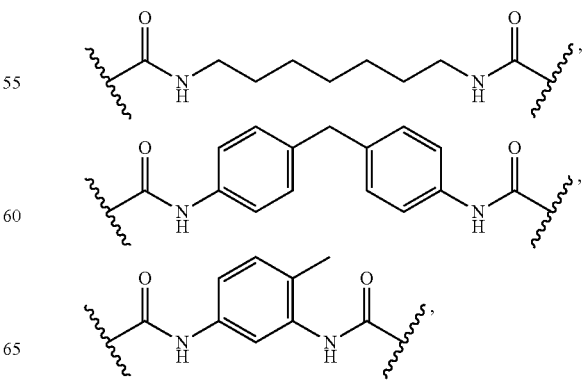

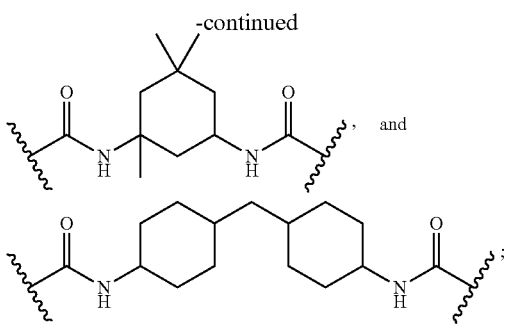

each O—$R^2$—O is independently the residue of a compound HO—$R^2$—OH selected from the group consisting of a polyether polyol, a polypropylene polyol, a polybutadiene polyol, a polycarbonate polyol, a polycaprolactone polyol, an acrylic polyol, and a silicone polyol; and m is greater than 0 and less than 5.

In a thirty-sixth aspect (36), the method according to the thirty-fifth aspect (35) is provided and $R^2$ has the structure —$R^7$—(O—$R^7$)$_x$— where $R^7$ is a divalent organic group and x is an integer greater than 10.

In a thirty-seventh aspect (37), the method according to the thirty-fifth aspect (35) or the thirty-sixth aspect (36) is provided and further includes reaction of the polyol with the capping compound.

In a thirty-eighth aspect (38), the method according to the thirty-first aspect (37) is provided and the reaction of the polyol with the capping compound forms a urethane diacrylate compound, the urethane diacrylate compound having the structure R—O—$R^2$—O—R, and where CFG is an acrylate group.

In a thirty-ninth aspect (39), the method according to any of aspects (31)-(38) is provided and m is greater than 0 and less than 3.

In a fortieth aspect (40), the method according to any of aspects (31)-(39) is provided and the polyol has a molecular weight in a range of 1000 g/mol to 8000 g/mol.

In a forty-first aspect (41), the method according to any of aspects (31)-(40) is provided and the polyol is polypropylene glycol.

In a forty-second aspect (42), the method according to any of aspects (31)-(41) is provided and the molar ratio of the diisocyanate compound to the polyol is 0.7 or less.

In a forty-third aspect (43), the method according to any of aspects (31)-(41) is provided and the molar ratio of the diisocyanate compound to the polyol is in a range of 0.25 to 0.7.

BRIEF DESCRIPTION OF THE DRAWINGS/FIGURES

DETAILED DESCRIPTION

Figure 1:
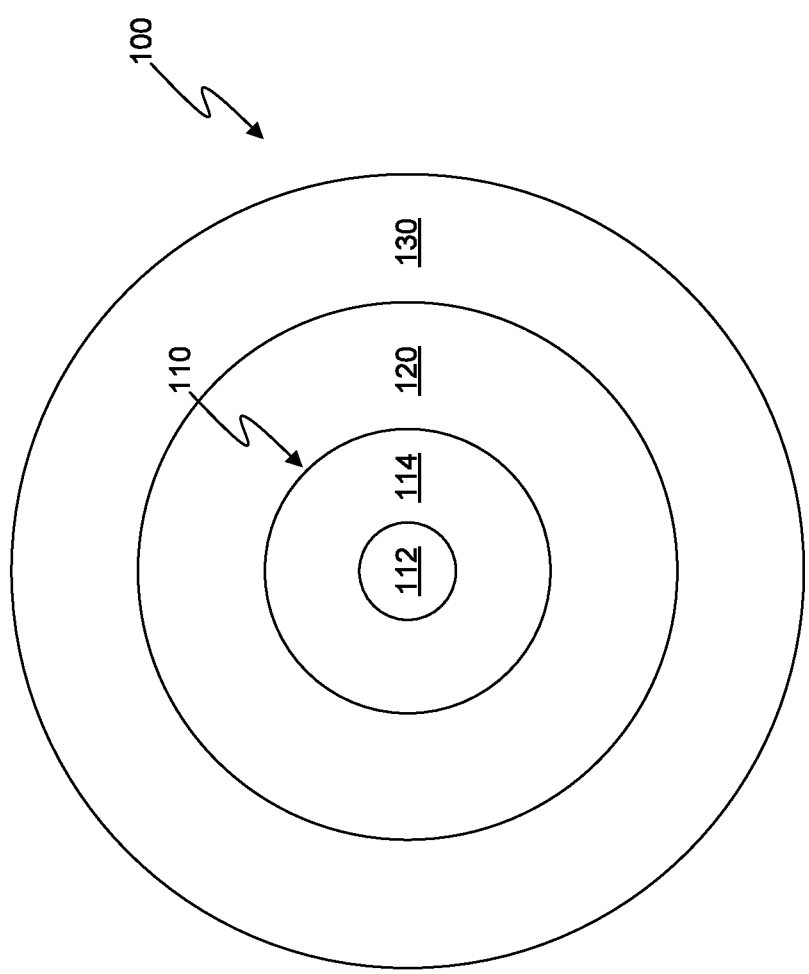
FIG. 1 illustrates an optical fiber according to some embodiments.

The following examples are illustrative, but not limiting, of the present disclosure. Other suitable modifications and adaptations of the variety of conditions and parameters normally encountered in the field, and which would be apparent to those skilled in the art, are within the spirit and scope of the disclosure.

Optical fibers can be coated with one or more polymer coatings, for example a primary coating and a secondary coating. The outer secondary coating can have a high modulus to protect the optical fiber from abrasion and exposure. The inner primary coating can be soft and reduce the microbending losses in the optical fiber by absorbing the mechanical stresses induced during fiber deployment in the cable and preventing them for propagating to the glass fiber. To achieve low microbending losses without making profile changes to the optical fiber designs, primary coatings with a low Young's modulus are desired.

Primary coating materials with sufficiently low Young's moduli, for example 1 MPa, can minimize bending losses in optical fibers. However, reducing the Young's modulus of a primary coating can make the primary coating more susceptible to damage during a fiber manufacturing process and/or during optical fiber installations. Thermal and mechanical stresses that occur during optical fiber coating processes and/or during post-manufacture fiber handling and configuration processes (e.g., stripping, cabling, and connecting operations) can lead to the formation of defects in a primary coating. Defect formation in a primary coating is more likely to occur if the Young's modulus of the primary coating material is low.

The low modulus of a primary coating typically also results in a lower cohesive strength for the coating. As a result, cohesive defects such as Primary Coating Compression Artifacts (PCCA) can appear in the coating due to the stresses that are induced, for example, during fiber cooling at the draw and during mechanical screening for quality control (especially at high draw speeds when time to build a polymer network is limited). Coating stresses include thermal stresses arising from differences in the thermal expansion coefficient of the glass fiber and a primary and/or secondary coating, and/or mechanical stresses that arise during a screening or proof-testing process to validate mechanical integrity.

Primary coatings with low Young's moduli and high tear strength have been described in U.S. Pat. No. 9,810,838. These coatings are formed from a radiation-curable coating composition that includes monomers, oligomers, one or more photoinitiators, and various additives. The modulus and other mechanical properties of these primary coatings are strongly influenced by the oligomer in the coating compositions. In order to obtain primary coatings that yield good fiber micro-bending performance and are defect-free, the properties of the primary coating can be tailored by controlling the composition of the oligomer in the curable composition used to form the primary coating.

Primary coating materials according to embodiments described herein have low Young's moduli and are also resistant to stress-induced defect formation during optical fiber manufacture and handling. Oligomers as described herein provide these primary coating materials with desirable properties. In addition to providing desirable properties, these oligomers can be made relatively quickly and inexpensively.

The coatings described herein are made from a curable coating composition (also referred to as a "curable precursor composition") including one or more curable components. The curable components include curable monomers and curable oligomers. As used herein, the term "curable" is intended to mean that the component, when exposed to a suitable source of curing energy, includes one or more curable functional groups capable of forming covalent bonds that participate in linking the component to itself or to other components of the coating composition. The product obtained by curing a curable coating composition is referred to herein as the cured product of the composition. In some embodiments, the cured product is employed as a coating material on an optical fiber.

A curing process is induced by energy. Forms of energy include radiation or thermal energy. A radiation-curable component is a component that can be induced to undergo a curing reaction when exposed to radiation of a suitable wavelength at a suitable intensity for a sufficient period of time. The radiation curing reaction may occur in the presence of a photoinitiator. A radiation-curable component may also be thermally curable. A thermally-curable component is a component that can be induced to undergo a curing reaction when exposed to thermal energy of sufficient intensity for a sufficient period of time. A thermally-curable component may also be radiation curable.

A curable component includes one or more curable functional groups. A curable component with only one curable functional group is referred to herein as a monofunctional curable component. A curable component having two or more curable functional groups is referred to herein as a multifunctional curable component or a polyfunctional curable component. Multifunctional curable components include two or more functional groups capable of forming covalent bonds during the curing process and can introduce crosslinks into the polymeric network formed during the curing process. Multifunctional curable components may also be referred to herein as "crosslinkers" or "curable crosslinkers." Examples of functional groups that participate in covalent bond formation during the curing process are identified hereinafter.

Various components of coating compositions described herein will be discussed and the amounts of particular components in the coating composition will be specified in terms of weight percent (wt %) or parts per hundred (pph). The components of the coating composition can include base components, for example oligomers and monomers, and additives. The concentration of base components will be expressed in terms of wt % and the concentration of additives will be expressed in terms of pph.

As used herein, the weight percent of a particular base component refers to the amount of the base component present in the coating composition on a basis that excludes additives. The additive-free coating composition includes only base components and is referred to herein as a base composition, base coating composition, or a base precursor composition. Any curable component(s) and polymerization initiator(s) present in a coating composition are regarded individually as base components and collectively as a base composition. In some embodiments, a base composition includes one or more radiation-curable component and a photoinitiator. Radiation-curable components may be a radiation-curable crosslinker or a radiation-curable diluent. Radiation-curable components may be a monomer or an oligomer. In some embodiments, a base composition includes one or more radiation-curable components and one or more polymerization initiators. The collective amount of base components in a coating composition is regarded herein as equaling 100 weight percent.

Additives are optional and may include one or more of a UV absorber, an adhesion promoter, an antioxidant, a catalyst, a carrier or surfactant, a tackifier, a stabilizer, and/or an optical brightener. Representative additives are described in more detail below. The amount of additives introduced into a coating composition is expressed herein in parts per hundred (pph) relative to the base composition. For example, if 1 g of a particular additive is added to 100 g of base composition, the concentration of that additive is expressed herein as 1 pph.

The term "molecular weight" when applied to polyols means number average molecular weight (Mn).

The term "(meth)acrylate" means acrylate or methacrylate.

Curable compositions according to embodiments described herein comprise an oligomer. The oligomer according to embodiments described herein has the following structure:

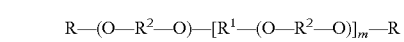

wherein R, $R^1$ and $R^2$ are as defined herein.

The oligomer is a curable compound prepared by reacting an oligomer precursor with a capping compound. The oligomer precursor (also referred to herein as a pre-oligomer compound) is a non-curable linear compound with two terminal hydroxyl (OH) groups. The capping compound includes a curable functional group (CFG) and a non-curable functional group. The non-curable functional group of the capping compound is a functional group that reacts with terminal OH groups. The oligomer is the product of a reaction of the capping compound with the oligomer precursor. More specifically, separate molecules of the capping compound react with each terminal OH group of the oligomer precursor to form the oligomer. The non-curable functional group of the capping compound reacts with a terminal OH group of the oligomer precursor to form a chemical bond and the curable functional group of the capping compound remains as an unreacted terminal group in the oligomer. Reaction of the oligomer precursor with the capping compound replaces terminal OH groups of the oligomer precursor with terminal curable functional groups from the capping compound. Each R in the formula of the curable oligomer is a residue from the capping compound that includes an unreacted terminal curable functional group and the chemical linkage resulting from reaction of the non-curable functional group of the capping compound with a terminal OH group of the oligomer precursor. Curable functional groups of the capping compound include ethylenically unsaturated groups such as (meth)acrylate groups. Non-curable functional groups of the capping compound include isocyanate groups, acid groups, chloride groups, and hydroxyl groups. The curable functional group and non-curable functional group of the capping compound can be bonded directly to each other or separated by a linking group. Linking groups include divalent organic groups such as linear or branched alkylene groups. Representative capping compounds include 2-isocyanatoethyl (meth)acrylate, HEA (2-hydroxyethyl acrylate), acrylic acid, and acryloyl-chloride. In some embodiments, each R is independently selected from the following structures.

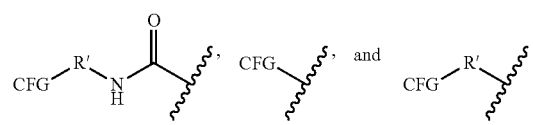

In each R, the CFG represents a curable functional group and R' is a divalent organic group. In some embodiments, CFG may be an ethylenically unsaturated group and R' is a linear or branched organic group with one or more alkylene linkages, ether linkages, ester linkages, amine linkages, or amide linkages. In some embodiments, the CFG may be an acrylate or a methacrylate group.

In some embodiments, each R is independently selected from the following structures.

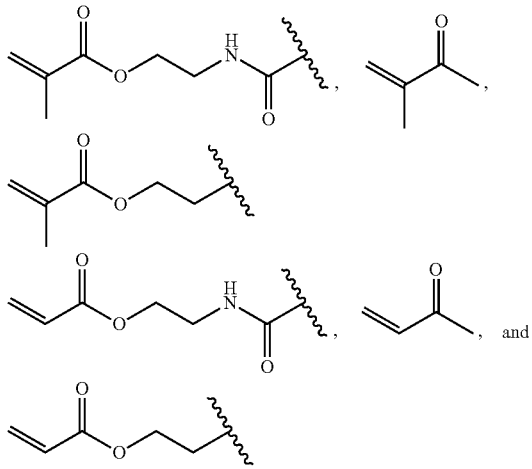

Each R' is the residue of a diisocyanate bonded to a polyol at both ends of the diisocyanate. The general structure of R' is

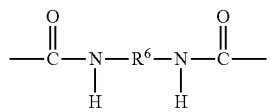

where $R^6$ is a divalent organic group, where $R^1$ is derived from a diisocyanate compound having the general structure $O=C=N-R^1-N=C=O$. In some embodiments of the above structure, each $R^1$ is independently selected from the following structures.

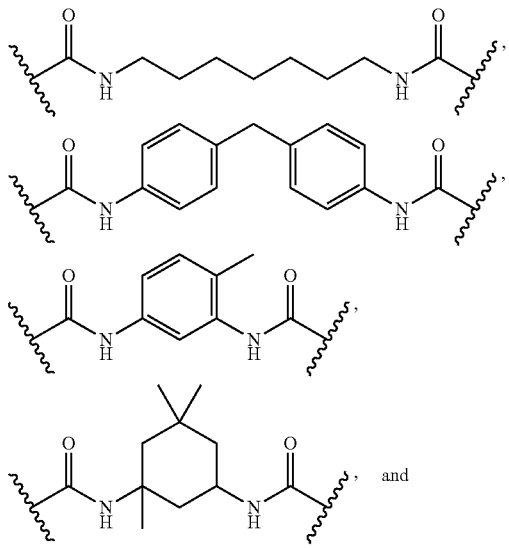

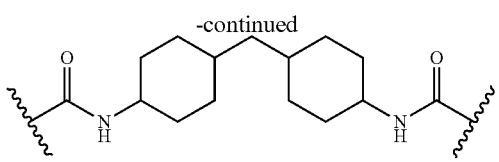

Each $O-R^2-O$ is independently the residue of a compound $HO-R^2-OH$ selected from the group of: a polyether polyol, a polypropylene polyol, a polybutadiene polyol, a polycarbonate polyol, a polycaprolactone polyol, an acrylic polyol, and a silicone polyol. In one embodiment, $R^2$ has the structure $-R^7-(O-R^7)_x-$ where $R^7$ is a divalent organic group, such as a linear or branched divalent alkylene group (e.g. ethylene group, propylene group, iso-propylene group etc.), and x is an integer greater than 10, or greater than 20, or greater than 30, or greater than 40, or greater than 50, or in the range from 10-100, or in the range from 15-80, or in the range from 20-70, or in the range from 25-65.

In some embodiments, m is greater than 0 and less than 5, including subranges. For example, m may be 0, 1, 2, 3, 4, or 5, or within a range having any two of these values as endpoints, inclusive of the end points. In some embodiments, m may be 1. In some embodiments, m may be 2. In some embodiments, m may be greater than 2. In some embodiments, m may be greater than 0 and less than 3.

In some embodiments, the amount of oligomer in a curable composition may be in the range of 40 wt % to 99 wt %, including subranges. For example, the amount of oligomer in a curable composition may be 40 wt %, 50 wt %, 60 wt %, 70 wt %, 75 wt %, 80 wt %, 85 wt %, 90 wt %, 95 wt %, or 99 wt %, or within a range having any two of these values as endpoints, inclusive of the endpoints. In some embodiments, the amount of oligomer in a curable composition may be 75 wt % or more. In some embodiments, the amount of oligomer in a curable composition may be 80 wt % or more. In some embodiments, the amount of oligomer in a curable composition may be 90 wt % or more.

In some embodiments, a curable composition may also include a curable monomer or a combination of curable monomers in addition to the oligomer. The curable monomer component of the curable coating composition is selected to be compatible with the oligomer, to provide a lower viscosity formulation (e.g. monomer diluent), and/or to influence the physical or chemical properties of the coating. In some embodiments, a monomer of the curable composition has the following structure:

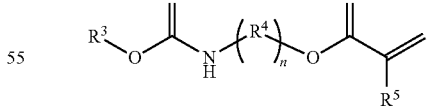

wherein $R^3$ is selected from the group of: a linear or branched aliphatic monovalent radical optionally interrupted by one or more oxygen atoms, aryl, or aralkyl; $R^4$ is selected from the group of a linear or branched aliphatic divalent radical, a branch aliphatic divalent radical optionally interrupted by one or more oxygen atoms, aryl, or aralkyl; and $R^5$ is selected from hydrogen or alkyl.

In some embodiments, n may be greater than or equal to 1 and less than or equal to 10, including subranges. For example, n may be 1, 2, 3, 4, 5, 6, 7, 8, 9, 10, or within a range having any two of these values as endpoints, inclusive of the endpoints.

In some embodiments, the curable coating composition may include one or more monofunctional monomers, one or more multifunctional monomers or a combination thereof. Exemplary monomers that may be included in the curable coating composition include ethylenically-unsaturated compounds, ethoxylated acrylates, ethoxylated alkylphenol monoacrylates, propylene oxide acrylates, n-propylene oxide acrylates, isopropylene oxide acrylates, monofunctional acrylates, monofunctional aliphatic epoxy acrylates, multifunctional acrylates, multifunctional aliphatic epoxy acrylates, and combinations thereof.

Representative radiation-curable ethylenically unsaturated monomers include alkoxylated monomers with one or more acrylate or methacrylate groups. An alkoxylated monomer is one that includes one or more alkoxylene groups, where an alkoxylene group has the form —O—$R^8$— and $R^8$ is a linear or branched alkylene group. Examples of alkoxylene groups include ethoxylene (—O—$CH_2$—$CH_2$—), n-propoxylene (—O—$CH_2$—$H_2$—$CH_2$—), iso-propoxylene (—O—$CH_2$—$CH(CH_3)$—), n-butoxylene (—O—$CH_2$—$CH_2$—$CH_2$—$CH_2$—), sec-butoxylene (—O—$CH_2$—$CH_2$—$CH(CH_3)$—), iso-butoxylene (—O—$CH_2$—$C(CH_3)_2$—), t-butoxylene (—O—$C(CH_3)_2$—$CH_2$—), etc. As used herein, the degree of alkoxylation refers to the number of alkoxylene groups in the monomer. In one embodiment, the alkoxylene groups are bonded consecutively in the monomer.

In some embodiments, a curable monomer component of a coating composition includes one or more monofunctional (meth)acrylate compounds (mono(meth)acrylate compounds). As used herein, the term "(meth)acrylate" means acrylate or methacrylate. A monofunctional acrylate compound has the general formula $R^{12}$—$R^{11}$—O—$(R^{13}$—O$)_q$—COCH=$CH_2$, where $R^{11}$, $R^{12}$ and $R^{13}$ are aliphatic, aromatic, or a mixture of both, and q=1 to 10, or $R^{11}$—O—$(R^{12}$—O$)_q$—COCH=$CH_2$, where $R^{11}$ and $R^{12}$ are aliphatic or aromatic, and q=1 to 10. Representative examples include ethylenically unsaturated monofunctional monomers such as lauryl acrylate (e.g., SR335 available from Sartomer Company, Inc., AGEFLEX FA12 available from BASF, and PHOTOMER 4812 available from IGM Resins), ethoxylated nonylphenol acrylate (e.g., M164 available from Miwon Specialty Chemical Company Ltd., SR504 available from Sartomer Company, Inc. and PHOTOMER 4066 available from IGM Resins), caprolactone acrylate (e.g., SR495 available from Sartomer Company, Inc., and TONE M-100 available from Dow Chemical), phenoxyethyl acrylate (e.g., SR339 available from Sartomer Company, Inc., AGEFLEX PEA available from BASF, and PHOTOMER 4035 available from IGM Resins), isooctyl acrylate (e.g., SR440 available from Sartomer Company, Inc. and AGEFLEX FA8 available from BASF), tridecyl acrylate (e.g., SR489 available from Sartomer Company, Inc.), isobornyl acrylate (e.g., SR506 available from Sartomer Company, Inc. and AGEFLEX IBOA available from CPS Chemical Co.), tetrahydrofurfuryl acrylate (e.g., SR285 available from Sartomer Company, Inc.), stearyl acrylate (e.g., SR257 available from Sartomer Company, Inc.), isodecyl acrylate (e.g., SR395 available from Sartomer Company, Inc. and AGEFLEX FA10 available from BASF), 2-(2-ethoxyethoxy)ethyl acrylate (e.g., SR256 available from Sartomer Company, Inc.), epoxy acrylate (e.g., CN120, available from Sartomer Company, and EBECRYL 3201 and 3604, available from Cytec Industries Inc.), lauryloxyglycidyl acrylate (e.g., CN130 available from Sartomer Company), phenoxyglycidyl acrylate (e.g., CN131 available from Sartomer Company), nonylphenol propoxylated (2) acrylate (e.g., MIRAMER M1602), and combinations thereof.

In some embodiments, a curable monomer component of a coating composition includes a multifunctional (meth)acrylate. Multifunctional (meth)acrylates are (meth)acrylates having two or more curable (meth)acrylate functional groups per molecule (di(meth)acrylates), or three or more curable (meth)acrylate functional groups per molecule (tri(meth)acrylates). Examples of multifunctional (meth)acrylates include dipentaerythritol monohydroxy pentaacrylate (e.g., PHOTOMER 4399 available from IGM Resins); methylolpropane polyacrylates with and without alkoxylation such as trimethylolpropane triacrylate, ditrimethylolpropane tetraacrylate (e.g., PHOTOMER 4355, IGM Resins); alkoxylated glyceryl triacrylates such as propoxylated glyceryl triacrylate with propoxylation being 3 or greater (e.g., PHOTOMER 4096, IGM Resins); and erythritol polyacrylates with and without alkoxylation, such as pentaerythritol tetraacrylate (e.g., SR295, available from Sartomer Company, Inc. (Westchester, Pa.)), ethoxylated pentaerythritol tetraacrylate (e.g., SR494, Sartomer Company, Inc.), dipentaerythritol pentaacrylate (e.g., PHOTOMER 4399, IGM Resins, and SR399, Sartomer Company, Inc.), tripropyleneglycol di(meth)acrylate, propoxylated hexanediol di(meth)acrylate, tetrapropyleneglycol di(meth)acrylate, pentapropyleneglycol di(meth)acrylate. In an embodiment, a multifunctional (meth)acrylate monomer is present in the curable coating composition at a concentration of from 0.05-15 wt %, or from 0.1-10 wt %. In some embodiments, a curable coating composition lacks a multifunctional (meth)acrylate monomer.

In some embodiments, a coating composition may include a combined amount of one or more monofunctional monomers in an amount less than 30 wt %, or less than 20 wt %, or less than 10 wt %, or less than 5.0 wt %, or in the range from 1 wt % to 30 wt %, or in the range from 1 wt % to 20 wt %, or in the range from 1 wt % to 10 wt %, or in the range from 5 wt % to 30 wt %, or in the range from 5 wt % to 20 wt %, or in the range from 5 wt % to 10 wt %. In some embodiments, the coating composition lacks a monofunctional (meth)acrylate monomer.

In some embodiments, a curable monomer component of a coating composition includes an N-vinyl amide such as an N-vinyl lactam, or N-vinyl pyrrolidinone, or N-vinyl caprolactam (NVC), In some embodiments, the N-vinyl amide monomer may be present in the coating composition at a concentration from 0.1 wt % to 40 wt %, or from 1.0 wt % to 10 wt %, or from 1.5 wt % to 7.0 wt %.

In some embodiments, the amount of monomer in a curable composition may be 70 wt % or less. In some embodiments, the amount of monomer in a curable composition may be 50 wt % or less. In some embodiments, the amount of monomer in a curable composition may be 30 wt % or less. In some embodiments, the amount of monomer in a curable composition may be 20 wt % or less. In some embodiments, the amount of monomer in a curable composition may be in the range of 1 wt % to 70 wt %, including subranges. For example, the amount of monomer in a curable composition may be 1 wt %, 5 wt %, 10 wt %, 15 wt %, 20 wt %, 30 wt %, 40 wt %, 50 wt %, 60 wt %, or 70 wt %, or within a range having any two of these values as endpoints, inclusive of the endpoints. These monomer amounts may be the amount of a single monomer type or the combined amount of two or more monomer types in a curable composition.

In some embodiments, a curable coating composition may include an initiator, for example a photoinitiator. In such embodiments, the photoinitiator facilitates initiation of the curing reaction and formation of a cured product from the coating composition. In some embodiments, the curing reaction is a polymerization reaction and the photoinitiator enhances the rate of the polymerization reaction. Photoinitiators include ketonic photoinitiating additives and/or phosphine oxide additives. When present, the photoinitiator is present in an amount sufficient to enable rapid radiation curing. The concentration of photoinitiator in a coating composition may be greater than 0.1 wt %, or greater than 0.25 wt %, or greater than 0.50 wt %, or greater than 0.75 wt %, or greater than 1 wt %, or in the range from 0.1 wt % to 10 wt %, or in the range from 0.1 wt % to 5 wt %, or in the range from 0.1 wt % to 2.5 wt %, or in the range from 0.25 wt % to 5 wt %, or in the range from 0.25 wt % to 2.5 wt %.

The wavelength of curing radiation can be infrared, visible, or ultraviolet. Representative wavelengths include wavelengths in the range from 250 nm (nanometers) to 1000 nm, or in the range from 250 nm to 700 nm, or in the range from 250 nm to 450 nm, or in the range from 275 nm to 425 nm, or in the range from 300 nm to 400 nm, or in the range from 320 nm to 390 nm, or in the range from 330 nm to 380 nm, or in the range from 340 nm to 370 nm. Curing can be accomplished with light sources that include a lamp source (e.g. Hg lamp), an LED source (e.g. a UVLED, visible LED, or infrared LED), or a laser source.

In some embodiments, a curable coating composition may include one or more additives. Optional additives include an adhesion promoter, a strength additive, an antioxidant, a catalyst, a stabilizer, an optical brightener, a property-enhancing additive, an amine synergist, a wax, a lubricant, and/or a slip agent. Some additives operate to control a polymerization process, thereby affecting the physical properties (e.g., modulus or glass transition temperature) of a cured product formed from the coating composition. Other additives can affect the integrity of the cured polymer product (e.g., protect against de-polymerization or oxidative degradation).

An adhesion promoter is a compound that facilitates adhesion of a coating and/or coating composition to glass (e.g. the cladding portion of a glass fiber). Suitable adhesion promoters include alkoxysilanes, mercapto-functional silanes, organotitanates, and zirconates. Representative adhesion promoters include mercaptoalkyl silanes or mercaptoalkoxy silanes such as 3-mercaptopropyl-trialkoxysilane (e.g., 3-mercaptopropyl-trimethoxysilane, available from Gelest (Tullytown, Pa.)); bis(trialkoxysilyl-ethyl)benzene; acryloxypropyltrialkoxysilane (e.g., (3-acryloxypropyl)-trimethoxysilane, available from Gelest), methacryloxypropyltrialkoxysilane, vinyltrialkoxysilane, bis(trialkoxysilylethyl)hexane, allyltrialkoxysilane, styrylethyltrialkoxysilane, and bis(trimethoxysilylethyl) benzene (available from United Chemical Technologies (Bristol, Pa.)); see U.S. Pat. No. 6,316,516, the disclosure of which is hereby incorporated by reference in its entirety herein.

In some embodiments, an adhesion promoter may be present in a coating composition in an amount of 0.02 pph to 10 pph, or 0.05 pph to 4 pph, or 0.1 pph to 4 pph, or 0.1 pph to 3 pph, or 0.1 pph to 2 pph, or 0.1 pph to 1 pph, or 0.5 pph to pph, or 0.5 pph to 3 pph, or 0.5 pph to 2 pph, or 0.5 pph to 1.0 pph.

Representative strength additives include mercapto-functional compounds, such as N-(tert-butoxycarbonyl)-L-cysteine methyl ester, pentaerythritol tetrakis(3-mercaptopropionate), (3-mercaptopropyl)-trimethoxysilane; (3-mercaptopropyl)trimethoxy-silane, and dodecyl mercaptan. In some embodiments, a strength additive may be present in a coating composition in an amount less than about 1 pph, or in an amount less than about 0.5 pph, or in an amount of about 0.01 pph to about 0.1 pph.

A representative antioxidant is thiodiethylene bis[3-(3,5-di-tert-butyl)-4-hydroxy-phenyl) propionate] (e.g., IRGANOX 1035, available from BASF). Representative amine synergists include triethanolamine; 1,4-diazabicyclo [2.2.2]octane (DABCO), triethylamine, and methyldiethanolamine. In some embodiments, an amine synergist may be present at a concentration of 0.02 pph to 0.5 pph. In some embodiments, a curable coating composition may include a photosensitizer.

Figure 2:
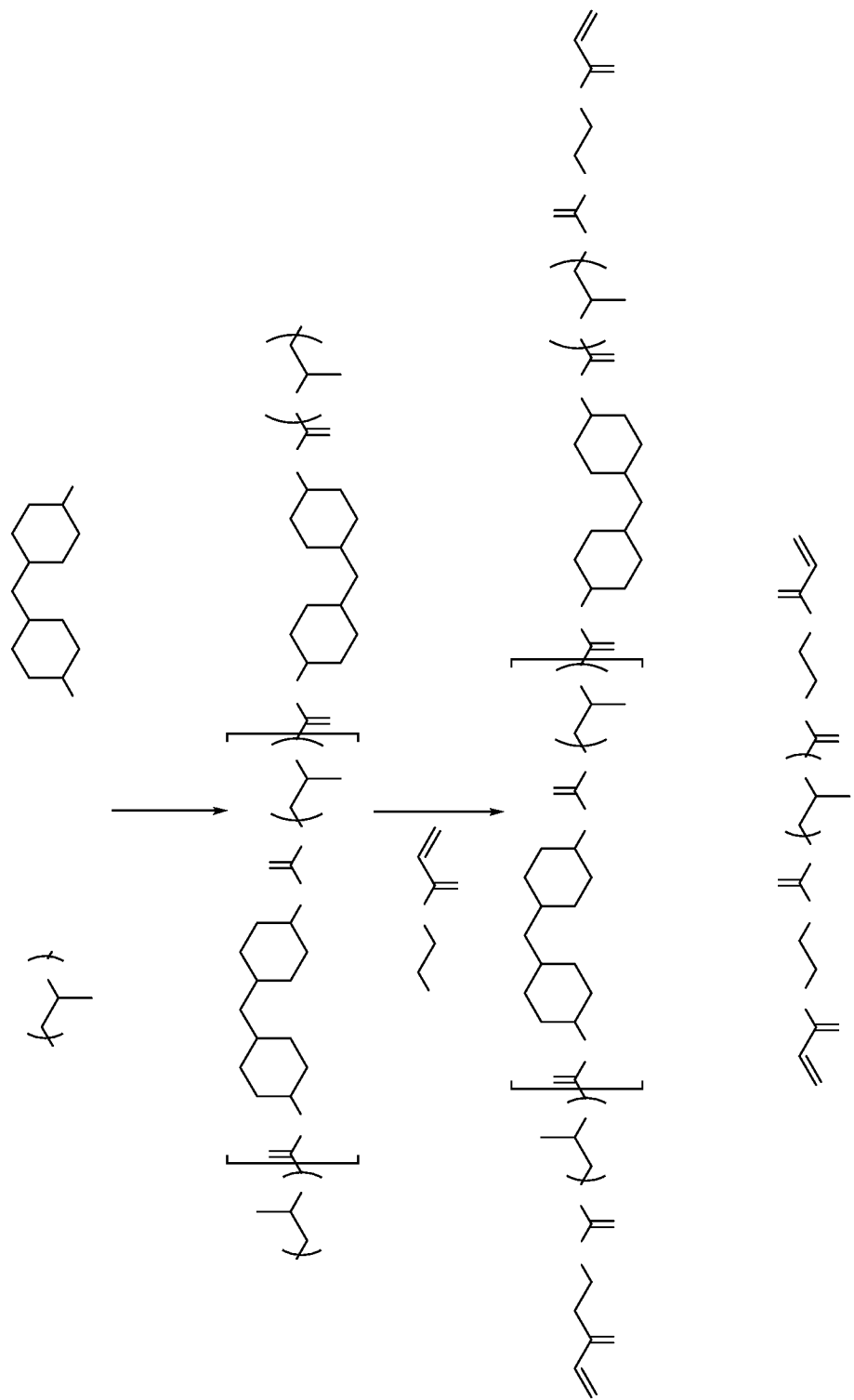
FIG. 2 illustrates a reaction pathway for synthesizing an oligomer according to some embodiments.

In some embodiments, a curable composition may include a urethane diacrylate compound. The urethane diacrylate compound may include the structure O—$R^2$—O described above. In one embodiment, the urethane diacrylate compound has the structure R—O—$R^2$—O—R, where CFG is an acrylate or a methacrylate group. The urethane diacrylate compound may be a byproduct of a reaction scheme used to synthesize an oligomer according to embodiments described herein. For example, the urethane diacrylate compound shown in FIG. 2 is the byproduct of reaction pathway 200. As described more fully below, the oligomer precursor is formed from a reaction of a polyol and a diisocyanate compound. The polyol includes two terminal OH groups. In some embodiments, the non-curable functional group of the capping compound is an isocyanate group and the terminal OH groups of the polyol react directly with the isocyanate group to form a urethane diacrylate compound.

In some embodiments, the wt % of the urethane diacrylate compound in a curable composition may be 5% or more. In some embodiments, the wt % of the urethane diacrylate compound in a curable composition may be 10% or more. In some embodiments, the wt % of the urethane diacrylate compound in a curable composition may be 15% or more. In some embodiments, the wt % of the urethane diacrylate compound in a curable composition may be in a range of 5% to 50%, including subranges. For example, the wt % of the urethane diacrylate compound in a curable composition may be 5%, 10%, 15%, 20%, 25%, 30%, 35%, 40%, 45%, or 50%, or within a range having any two of these values as endpoints, inclusive of the endpoints. Generally, as the molar ratio of a diisocyanate compound to a polyol in a mixture used to make a curable composition as described herein increases, the urethane diacrylate compound wt % in the curable composition decreases. Additionally, the viscosity of the mixture increases as the molar ratio of a diisocyanate compound to a polyol increases. To facilitate oligomer synthesis, it can be desirable to keep the viscosity low to promote mixing during oligomer synthesis (e.g., to promote uniform stirring of the mixture while synthesizing). Accordingly, keeping the wt % of the urethane diacrylate compound in a mixture (and also a curable composition) at or below 50% can facilitate efficient oligomer synthesis. On the other hand, the urethane diacrylate compound can have a lower molecular weight than the synthesized oligomer, and thus it can help keep the viscosity of the mixture low. Accordingly, keeping the wt % of the urethane diacrylate compound in a mixture (and also a curable composition) at 5% or more can facilitate efficient oligomer synthesis.

The weight percent of the urethane diacrylate compound in a curable composition is measured using gel permeation chromatography according to the following test method. A Waters Alliance 2690 GPC instrument was used to characterize the oligomers prepared in sample compositions. The mobile phase was THF (tetrahydrofuran). The instrument included a series of three Polymer Labs columns. Each column had a length of 300 mm (millimeters) and an inside diameter of 7.5 mm. Two of the columns (columns 1 and 2) were sold under Part No. PL1110-6504 by Agilent Technologies and were packed with PLgel Mixed D stationary phase (polystyrene divinyl benzene copolymer, average particle size=5 μm, specified molecular weight range=200-400,000 g/mol). The third column (column 3) was sold under Part No. PL1110-6520 by Agilent Technologies and was packed with PLgel 100A stationary phase (polystyrene divinyl benzene copolymer, average particle size=5 μm, specified molecular weight range=up to 4,000 g/mol). The columns were calibrated with polystyrene standards ranging from 162-6,980,000 g/mol using EasiCal PS-1 & 2 polymer calibrant kits (Agilent Technologies Part Nos. PL2010-505 and PL2010-0601). The GPC instrument was operated under the following conditions: flow rate=1.0 mL/min, column temperature=40° C., injection volume=100 ∥L, and run time=35 min (isocratic conditions). The detector was a Waters Alliance 2410 differential refractometer operated at 40° C. and sensitivity level 4. The samples were injected twice along with a THF+0.05% toluene blank. The amount of a urethane diacrylate compound is determined by comparing its concentration to a calibration plot made with the urethane diacrylate standard sample at various concentrations.

The curable compositions according to embodiments described herein may be cured to form a coating. The coating may be a polymer coating for an optical fiber, for example a primary coating for an optical fiber.

FIG. 1 illustrates a schematic cross-sectional axial view of a coated optical fiber 100 according to some embodiments. Coated optical fiber 100 has a lateral direction extending in the major length of the coated optical fiber 100 and an axial direction having a substantially circular cross-section, as shown in FIG. 1. Coated optical fiber 100 includes an optical fiber 110. Optical fiber 110 (sometimes referred to as a fiber segment or a waveguide) includes a core 112 and a cladding 114. Cladding 114 is surrounded by primary coating 120 disposed over cladding 114.

In some embodiments, primary coating 120 may be surrounded by a secondary coating 130 disposed over primary coating 120. As used herein in the context of the positioning of a coating, the term "surrounding" means that the underlying optical fiber or coating is at least surrounded in the axial direction by the outer, surrounding coating, where the terminal ends of the coated optical fiber are not necessarily surrounded by the coating layer in the lateral direction. For example, as shown in FIG. 1, primary coating 120 surrounds optical fiber 110 and secondary coating 130 surrounds primary coating 120. In some embodiments, primary coating 120 may be in direct contact with cladding 114 of optical fiber 110. In some embodiments, secondary coating 130 may be in direct contact with primary coating 120. In some embodiments, coated optical fiber 100 may include interlayers positioned between optical fiber 110 and primary coating 120 and/or between primary coating 120 and secondary coating 130.

Core 112 and cladding 114 may comprise a wide variety of transparent materials, including glass, polymers, and the like. Generally, cladding 114 has a lower refractive index than core 112. Optical fiber 110 may be a single mode fiber or a multimode fiber. Optical fiber 110 may be adapted for use as a data transmission fiber (e.g., SMF-28®, LEAF®, and METROCOR®, each of which is available from Corning Incorporated of Corning, N.Y.). In some embodiments, optical fiber 110 may perform an amplification, dispersion compensation, or polarization maintenance function. It should be understood that that the coatings (e.g., primary coatings and secondary coatings) described herein are suitable for use with virtually any optical fiber for which protection from the environment is desired.

Secondary coating 130 may be formed from a cured polymeric material, and may typically have a thickness in the range of 20 μm (micrometers, microns) to 35 μm, for example, about 27.5 μm. Secondary coating 130 may have sufficient stiffness to protect optical fiber 110; may be flexible enough to be handled, bent, or spooled; may have a relatively small tackiness to enable handling and prevent adjacent convolutions on a spool from sticking to one another; may be resistant to water and chemicals such as optical fiber cable filling compound; and may have adequate adhesion to the coating to which it is applied (e.g., the primary coating 120). Secondary coating compositions may include oligomers, monomers, and other additives, and in some embodiments, may comprise a low concentration of oligomers (i.e., less than about 3%). Generally, the material of the secondary coating 130 has a relatively high Young's modulus, such as greater than about 1000 MPa, 1200 MPa, 1400 MPa, 1600 MPa, 1800 MPa, or even greater than about 2000 MPa.

Primary coating 120 may be a cured polymer product of a curable composition (curable precursor composition) as described herein with an oligomer having the following structure:

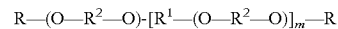

R—(O—R²—O)-[R¹—(O—R²—O)]$_m$—R wherein R, R¹ and R² are as described above.

In some embodiments, the curable composition for primary coating 120 may include a curable monomer or a combination of curable monomers as described herein. In some embodiments, the curable composition for primary coating 120 may include one or more additive as described herein. In some embodiments, the curable composition for primary coating 120 may include an initiator, for example a photoinitiator as described herein.

In some embodiments, primary coating 120 may have a tear strength measured according to a test as described herein of 20 J/m² (joules per square meter) or more. In some embodiments, primary coating 120 may have a tear strength in the range of 20 J/m² to 55 J/m², including subranges. For example, primary coating 120 may have a tear strength of 20 J/m², 25 J/m², 30 J/m², 35 J/m², 40 J/m², 50 J/m², or 55 J/m², or within a range having any two of these values as endpoints, inclusive of the endpoints. In some embodiments, primary coating 120 may have a tear strength in the range of 30 J/m² to 55 J/m².

Tear strength ($G_c$) is related to the force required to break a coating when the coating is under tension. The technique is described more fully below and with the technique, tear strength can be calculated from Eq. (1):

$$G_c = \frac{\left(\frac{F_{break}}{B \cdot d} \cdot C \cdot \sqrt{\pi \frac{b}{2}}\right)^2}{S} \quad (1)$$

where $F_{break}$ is the force at break, b is the slit length, d is the film thickness, B is the width of the test sample. S is the segment modulus calculated from the stresses at elongations of 0.05% and 2%, and C is a sample geometry factor defined as follows for the technique used herein to determine tear strength:

$$C = \sqrt{\frac{1}{\cos\left(\frac{\pi b}{2B}\right)}} \quad (2)$$

Tear strength values disclosed herein was measured with a MTS Sintech tensile tester. Each coating composition was cast on a glass plate with the aid of a draw-down box having a gap thickness of about 0.005 inches and immediately cured under UV irradiation using a dose of 1 J/cm² at the coating sample. The shape and dimensions of the cured films were prepared according to the International Standard ISO 816 (second edition 1983-12-01, "Determination of tear strength of small test pieces (Delft test pieces)"). The cured films were conditioned at 23° C.±2° C. and 50% relative humidity (RH) for at least 16 hours. The initial gauge length was 5.0 cm and test speed was set at 0.1 mm/min. Three to five specimens of each film were tested. Tear strength (Ge) was calculated from Eqs. (1) and (2). For the test instrument used in the measurements, slit length b was 5.0 mm, width B of the test piece was 9.0 mm, and sample geometry factor C was 1.247.

In some embodiments, primary coating 120 may have a glass transition temperature (Tg) measured according to a test as described herein of −45° C. or less. In some embodiments, primary coating 120 may have a glass transition temperature in the range of −45° C. to −60° C., including subranges. For example, primary coating 120 may have a glass transition temperature of −45° C., −50° C., −55° C., or −60° C., or within a range having any two of these values as endpoints, inclusive of the end points.

Glass transition temperature values disclosed herein was measured using dynamic mechanical analysis (DMA). DMA tests were conducted on films using an RSA-G2 Dynamic Mechanical Analyzer (TA Instruments). The gauge length of the film specimens ranged 10-25 mm, the width ranged from 7-10.5 mm, and the thickness ranged 0.18-1.1 mm. Temperature ramp tests were performed dynamically in tension using FRT (Force/torque Rebalance Transducer) normal force transducer mode. Force tracking mode was used with a setting of axial force>dynamic force equal to 30% and a minimum force of 0.005 N. Auto strain adjustment mode was enabled using a strain adjust of 20%, minimum strain of 0.001% and maximum strain in the range of 0.2-1.5%. Once loaded, the specimen was cooled to the starting temperature of −100° C. The test was completed by ramping the temperature at 2° C./min up to 100° C. while oscillating the specimen at a frequency of 1 Hz. The analyzer determined the tensile storage modulus (E'), loss modulus (E"), and tan delta (E"/E') as a function of temperature. $T_g$ is defined as the temperature at the maximum of the tan delta peak.

In some embodiments, primary coating 120 may have a Young's modulus measured according to a test as described here of 1 MPa (megapascal) or less. In some embodiments, primary coating 120 may have a Young's modulus in a range of 0.1 MPa to 1 MPa, including subranges. For example, primary coating 120 may have a Young's modulus of 0.1 MPa, 0.2 MPa, 0.25 MPa, 0.3 MPa, 0.4 MPa, 0.5 MPa, 0.6 MPa, 0.7 MPa, 0.75 MPa, 0.8 MPa, 0.9 MPa, or 1 MPa, or within a range having any two of these values as endpoints, inclusive of the endpoints. In some embodiments, primary coating 120 may have a Young's Modulus of 0.6 MPa or less.

In some embodiments, primary coating 120 may have a percent elongation measured according to a test as described herein of 100% or more. In some embodiments, primary coating 120 may have a percent elongation of 150% or more. In some embodiments, primary coating 120 may have a percent elongation in a range of 100% to 200%, including subranges. For example, primary coating 120 may have a percent elongation of 100%, 110%, 120%, 130%, 140%, 150%, 160%, 170%, 180%, 190%, or 200%, or within a range having any two of these values as endpoints, inclusive of the endpoints.

In some embodiments, primary coating 120 may have a tensile strength measured according to a test as described herein of 0.25 MPa or more. In some embodiments, primary coating 120 may have a tensile strength of 0.3 MPa or more. In some embodiments, primary coating 120 may have a tensile strength of 0.4 MPa or more. In some embodiments, primary coating 120 may have a tensile strength of 0.5 MPa or more. In some embodiments, primary coating 120 may have a tensile strength of 0.6 MPa or more. In some embodiments, primary coating 120 may have a tensile strength in the range of 0.25 MPa to 0.75 MPa, including subranges. For example, in some embodiments, primary coating 120 may have a tensile strength of 0.25 MPa, 0.3 MPa, 0.4 MPa, 0.5 MPa, 0.6 MPa, 0.7 MPa, or 0.75 MPa, or within a range having any two of these values as endpoints, inclusive of the endpoints.

Young's modulus values, percent elongation values, and tensile strength values disclosed herein were measured for sample films of material. Wet films of a coating composition were cast on silicone release paper using a draw-down box having a gap thickness of about 0.005 inches. The wet films were cured with a UV dose of 1.2 J/cm² at the film (measured over a wavelength range of 225-424 nm by a Light Bug model IL490 from International Light) using a Fusion Systems UV curing apparatus with a 600 W/in D-bulb (50% Power and approximately 12 feet/minute belt speed) to yield cured coatings in film form. Cured film thickness was between about 0.003 inch and about 0.0035 inch.

The films were allowed to age at 23° C., 50% relative humidity for at least 16 hours prior to testing. Film samples were cut to dimensions of 12.5 cm×13 mm using a cutting template and a scalpel. Young's modulus, percent elongation (% strain at break), and tensile strength were measured on the film samples using an Instron tensile test instrument following procedures set forth in ASTM Standard D882-97. Films were tested at an elongation rate of 2.5 cm/min with the initial gauge length of 5.1 cm. Young's modulus was defined as the steepest slope of the beginning of the stress-strain curve. Percent elongation was defined as the strain at break of the test film. Tensile strength was defined as the strength at break of the test film.

Methods of making an oligomer according to embodiments disclosed herein include reacting a polyol with a diisocyanate compound to form a pre-oligomer compound (oligomer precursor) having one or more internal urethane linkages and terminal OH groups. By forming the pre-oligomer under conditions of excess polyol, the terminal OH groups are formed. After formation, the pre-oligomer compound may be reacted with a capping compound comprising an isocyanate group and a curable functional group (CFG) to cap the pre-oligomer compound and thereby form the oligomer. The CFG may be an ethylenically unsaturated group.

In some embodiments, the CFG may be an acrylate or a methacrylate. An exemplary reaction pathway 200 for an oligomer according to some embodiments is shown in FIG. 2.

One or more polyols may be used to make the oligomer. The polyol(s) used to make the oligomer may be di-functional. The polyol(s) used to make the oligomer may have a molecular weight in the range of 1000 g/mol to 20000 g/mol, including subranges. For example, the molecular weight of the polyol(s) may be 1000 g/mol, 2000 g/m, 3000 g/mol, 4000 g/mol, 5000 g/mol, 6000 g/mol, 7000 g/mol, 8000 g/mol, 9000 g/mol, 10000 g/mol, 11000 g/mol, 12000 g/mol, 13000 g/mol, 14000 g/mol, 15000 g/mol, 16000 g/mol, 17000 g/mol, 18000 g/mol, 19000 g/mol, or 20000 g/mol, or within a range having any two of these values as endpoints, inclusive of the endpoints. In some embodiments, the polyol(s) may have a molecular weight in the range of 1000 g/mol to 8000 g/mol. In some embodiments, more than one kind of polyol may be used. In such embodiments, at least one of the polyols may have a molecular weight of 6000 g/mol or less. Exemplary polyols include polyether polyols, polypropylene polyols, polybutadiene polyols, polycarbonate polyols, polycaprolactone polyols, acrylic polyols, and silicone polyols. Exemplary polyether polyols include polyethylene glycol (PEO). Exemplary polypropylene polyols include polypropylene glycols (e.g., PPG4000). Exemplary polybutadiene polyols include polybutylene glycol (PBG). Other examples of polyols include polyester polyol (PethG) and combination thereof (e.g., PEO/PPG random and block copolymers, PEO/PPG/PBG copolymers, e.g., Plusonic® and Tetronic® polyols, etc.) also amine capped polyols (e.g., Jeffamine® (PEO/PPG—amine capped).

One or more diisocyanates compounds may be used to make the oligomer. Exemplary diisocyanate compounds include 4,4'-Methylene dicyclohexyl diisocyanate (H12MDI), isophorone diisocyanate (IPDI), toluene diisocyanate (TDI), methylene diphenyl diisocyanate (MDI), and hexamethylene diisocyanate (HDI).

In some embodiments, a molar ratio of the diisocyanate compound to the polyol in a pre-reacted mixture of the diisocyanate compound and the polyol may be 0.7 or less. In some embodiments, a molar ratio of the diisocyanate compound to the polyol in a pre-reacted mixture of the diisocyanate compound and the polyol may be 0.6 or less. In some embodiments, a molar ratio of the diisocyanate compound to the polyol in a pre-reacted mixture of the diisocyanate compound and the polyol may be 0.5 or less. In some embodiments, a molar ratio of the diisocyanate compound to the polyol in a pre-reacted mixture of the diisocyanate compound and the polyol may be 0.4 or less. In some embodiments, a molar ratio of the diisocyanate compound to the polyol in a pre-reacted mixture of the diisocyanate compound and the polyol may be 0.25 or more. In some embodiments, a molar ratio of the diisocyanate compound to the polyol in a pre-reacted mixture of the diisocyanate compound and the polyol may be 0.3 or more. In some embodiments, a molar ratio of the diisocyanate compound to the polyol in a pre-reacted mixture of the diisocyanate compound and the polyol is in a range of 0.25 to 0.7, including subranges. For example, the molar ratio of the diisocyanate compound to the polyol in a pre-reacted mixture may be 0.25, 0.3, 0.4, 0.5, 0.6, or 0.7, or within a range having any two of these values as endpoints, inclusive of the endpoints.

Embodiments according to the present disclosure are further illustrated using following examples.

In FIG. 2 illustrates reaction pathway 200 for synthesis of an oligomer having the following structure:

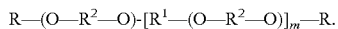

In general, novel oligomers are synthesized by reacting a polyol or combination of polyols:

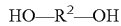

where HO—R²—OH is defined above, with one or more diisocyanate compounds O=C=N—R¹—N=C=O, for example, 4,4'-Methylene dicyclohexyl diisocyanate (H12MDI), isophorone diisocyanate (IPDI), toluene diisocyanate (TDI), methylene diphenyl diisocyanate (MDI), and/or hexamethylene diisocyanate (HDI) to create a pre-oligomer compound comprising internal urethane linkages and terminal OH groups:

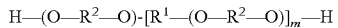

where $R^1$ and $R^2$ are defined above. The pre-oligomer compound is then reacted with a capping compound containing a curable functional group and a non-curable functional group as described above to form the oligomer. In one embodiment, the capping compound incudes an acrylate group as the curable functional group and an isocyanate group as a non-curable functional group. In the example shown in FIG. 2, the capping compound is IEA (2-isocyanatoethyl acrylate). Further, the excess HO—R²—OH in the step to synthesize the pre-oligomer can react in some embodiments with a capping compound comprising an isocyanate group and a curable functional group (CFG) to give a urethane diacrylate compound, R—O—R²—O—R.

Figure 3:
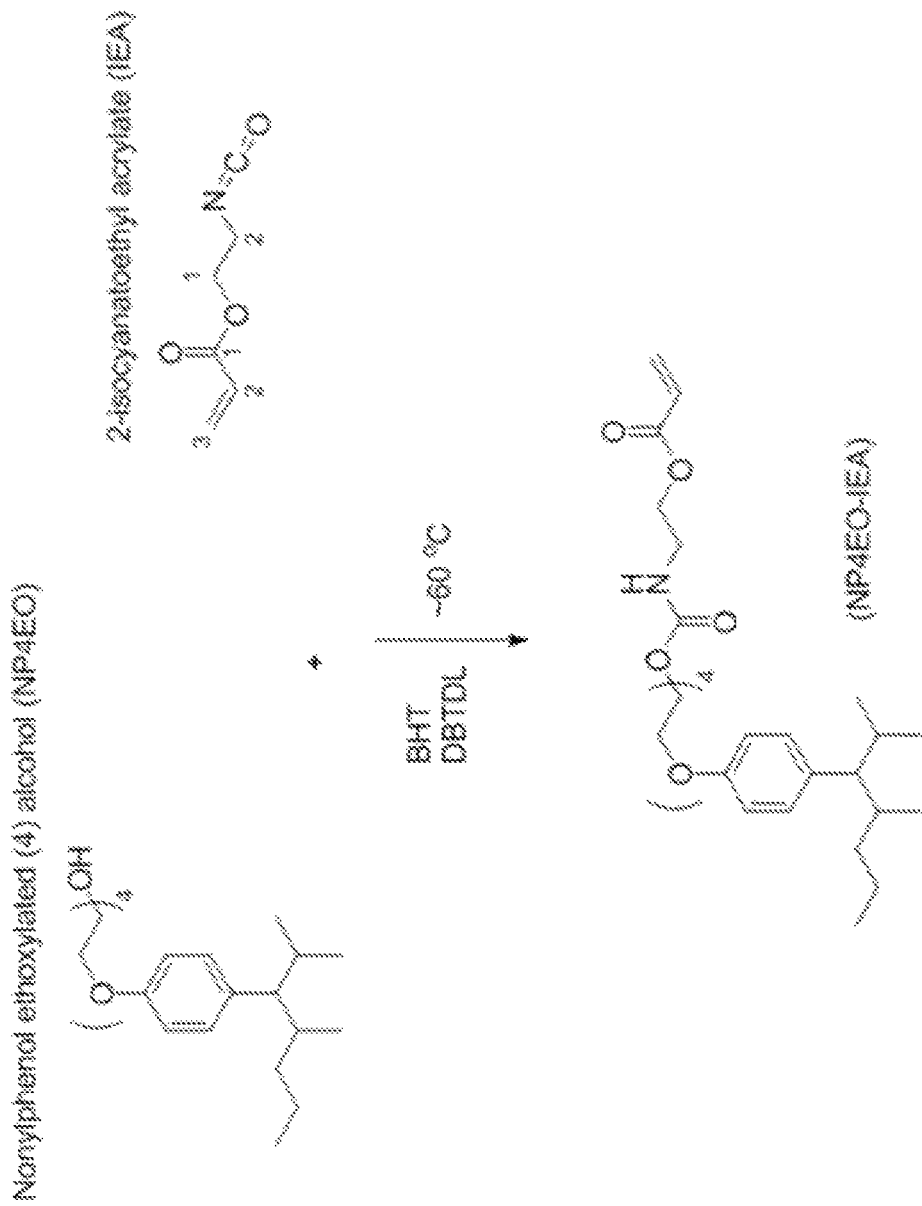
FIG. 3 illustrates a reaction pathway for synthesizing a monomer according to some embodiments.

FIG. 3 shows a reaction pathway 300 for the synthesis of a urethane acrylate monomer NP4EO-IEA in Example 5 below. This representative pathway can be used to synthesize other monomers having the following structure.

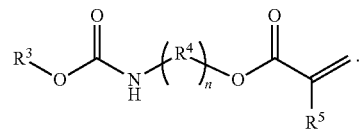

In general, novel monomers are synthesized by reacting a mono hydroxyl compound;

with an acrylated isocyanate compound:

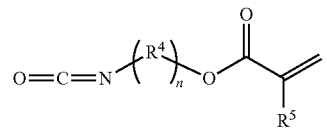

to create the urethane-acrylate monomer. $R^3$, $R^4$, and $R^5$ are defined above. These monomers can be used alone or in combination with standard monomers (such as the family of (meth)acrylate monomers offered by Sartomer, Inc.) to form urethane-acrylate coatings as described herein.

Table 1 below shows exemplary concentrations of urethane diacrylate (UDA) compound in the preparation of representative embodiments of the oligomer from reactions of selected diisocyanate compounds and the polyol PPG4000 (polypropylene glycol having a number average molecular weight of approximately 4000 g/mol) using different molar ratios (MR) of the diisocyanate compound to the polyol (PPG4000) and IEA as the capping compound. In each embodiment, the percent of urethane di-acrylate concentration in the oligomer (as measured by GPC) is greater than 10 wt %. In Table 1, IPDI is isophorone diisocyanate and H12MDI has the formula shown in FIG. 2.

TABLE 1

| Oligomer | Isocyanate | MR (Isocyanate/polyol) | wt % UDA |
|---|---|---|---|
| BY22 | IPDI | 2/3.4 | 10.91 |
| BY21 | H12MDI | 2/3.4 | 11.22 |
| BY19 | IPDI | 2/4 | 16.00 |
| BY17 | H12MDI | 2/4 | 16.40 |

Figure 4:
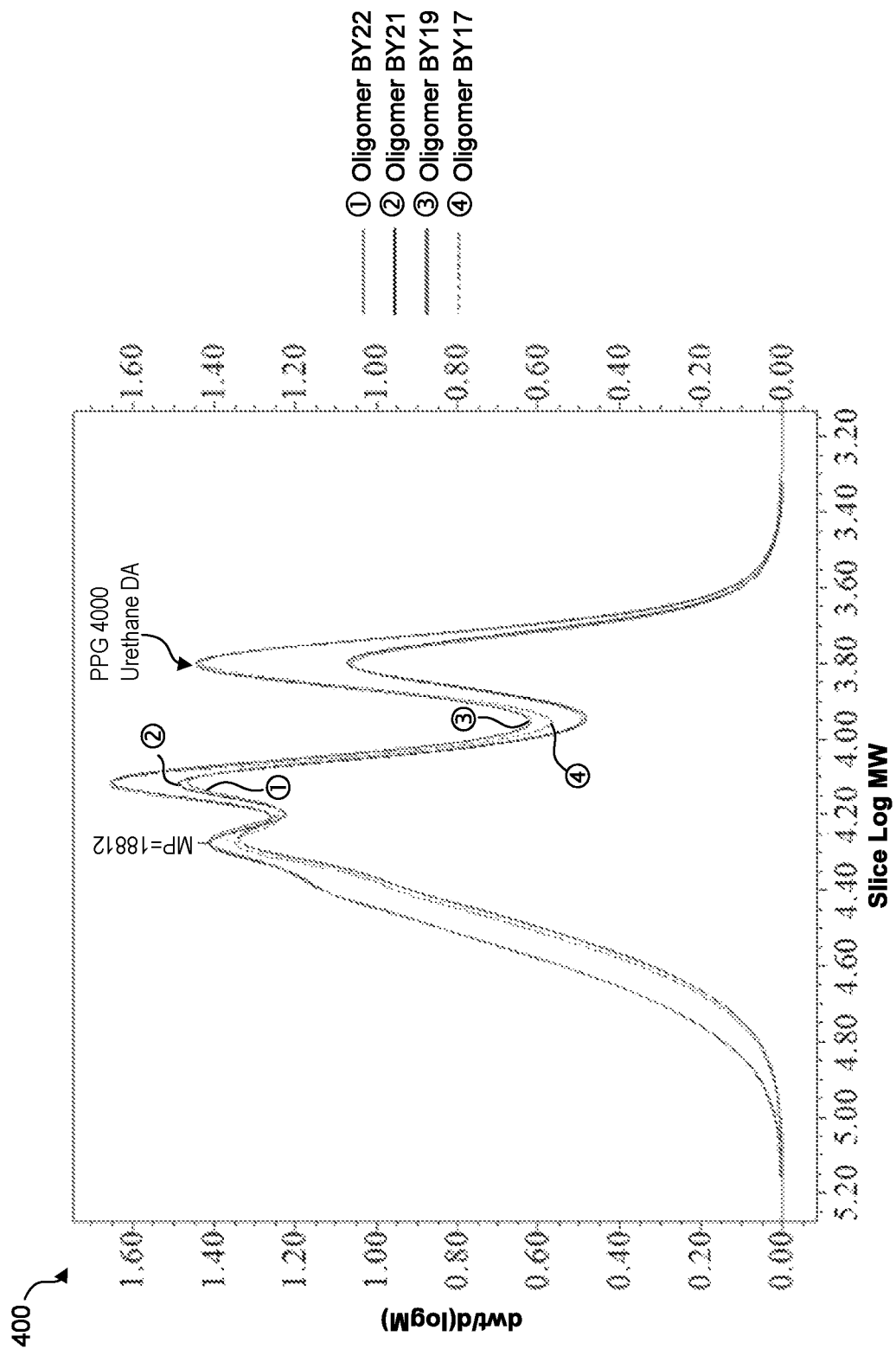
FIG. 4 is a graph of gel permeation chromatography spectra for oligomers according to various embodiments.

In FIG. 4 shows a graph 400 of the GPC spectra for the oligomers shown in Table 1 and synthesized according to the reaction pathway in FIG. 2. FIG. 4 shows the GPC spectra of the oligomers in Table 1. FIG. 4 also shows the PPG4000 urethane di-acrylate peak at log(MW)=3.7. This peak in the GPC spectra can be used to quantify the concentration of the urethane diacrylate material in the curable compositions.

Table 2 shows exemplary curable compositions formulated with oligomers made according to the reaction scheme of FIG. 2 and subsequently cured to form film samples for testing. In Table 2, Lucirin TPO is a photoinitiator (2,4,6-trimethylbenzoyl)diphenyl phosphine oxide).

TABLE 2

| Formulation | Coating No. | | | | | | | |
|---|---|---|---|---|---|---|---|---|
| | P1380-59 | P1380-64 | P1380-61 | P1380-66 | P1380-68 | P1380-69 | P1380-65 | P1380-67 |
| Oligomer (wt %) | BY17 (96.5) | BY17 (80.5) | BY19 (96.5) | BY19 (81.5) | BY17 (80.5) | BY19 (81.5) | BY21 (96.5) | BY22 (96.5) |
| Monomer (wt %) | / | M164 (16.0) | / | M164 (15.0) | M1602 (16.0) | M1602 (15.0) | / | / |
| N-vinylcaprolactam (wt %) | 2.00 | 2.00 | 2.00 | 2.00 | 2.00 | 2.00 | 2.00 | 2.00 |
| Lucirin TPO (wt %) | 1.50 | 1.50 | 1.50 | 1.50 | 1.50 | 1.50 | 1.50 | 1.50 |
| Irganox 1035 (pph) | 1.00 | 1.00 | 1.00 | 1.00 | 1.00 | 1.00 | 1.00 | 1.00 |
| 3-Mercaptopropyl trimethoxysilane (pph) | 0.032 | 0.032 | 0.032 | 0.032 | 0.032 | 0.032 | 0.032 | 0.032 |
| Pentaerythritol mercaptopropionate (pph) | 0.80 | 0.80 | 0.80 | 0.80 | 0.80 | 0.80 | 0.80 | 0.80 |
| Total (pph) | 101.832 | | | | | | | |

Tables 3-5 show coating composition and film properties for cured products of some of the coating compositions of Table 2. The oligomer included in the coating compositions used to make the film samples of Tables 3 and 4 were made using the reaction scheme shown in FIG. 2 with a molar ratio of diisocyanante compound (H12MDI) to polyol (PPG4000) of 2/4 (0.5). The oligomer included in the coating compositions of Table 5 were made from a curable composition having using the reaction scheme shown in FIG. 2 with a molar ratio of diisocyanante compound (H12MDI) to polyol (PPG4000) of 2/3.4 (0.59). In Tables 3-5, YM refers to Young's modulus, TS refers to tensile strength, and $T_g$ refers to glass transition temperature.

TABLE 3

| Oligomer | Coating ID | Monomer | Viscosity (P) | | Tensile Properties | | | Tear Strength (J/m$^2$) | Film Tg (° C.) |
|---|---|---|---|---|---|---|---|---|---|
| | | | 25° C. | 65° C. | YM (MPa) | Elongation (%) | TS (MPa) | | |
| BY17 | P1380-59 | w/o monomer | | | 0.97 ± 0.01 | 102 ± 15.0 | 0.49 ± 0.04 | | |
| | P1380-64 | 16 wt % M164 | 77.7 | 9.73 | 0.64 ± 0.01 | 132 ± 14.8 | 0.39 ± 0.03 | 34 ± 3 | −50.6 |
| BY19 | P1380-61 | w/o monomer | | | 0.94 ± 0.01 | 114 ± 25.2 | 0.51 ± 0.07 | | |
| | P1380-66 | 15 wt % M164 | 67.6 | 8.7 | 0.63 ± 0.01 | 152 ± 23.5 | 0.43 ± 0.04 | 33 ± 2 | −50.8 |

TABLE 4

| Oligomer | Coating ID | Monomer | Viscosity (P) 25° C. | Viscosity (P) 65° C. | Tensile Properties YM (MPa) | Tensile Properties Elongation (%) | Tensile Properties TS (MPa) | Tear Strength (J/m$^2$) | Film Tg (° C.) |
|---|---|---|---|---|---|---|---|---|---|
| BY17 | P1380-68 | 16 wt % M1602 | 87.3 | 10.35 | 0.63 ± 0.02 | 124 ± 14.4 | 0.37 ± 0.03 | 31 ± 2 | −49.7 |
| BY19 | P1380-69 | 15 wt % M1602 | 73.9 | 8.86 | 0.65 ± 0.01 | 127 ± 22.0 | 0.39 ± 0.05 | 33 ± 3 | −51.1 |

TABLE 5

| Oligomer | Coating ID | Monomer | Viscosity (P) 25° C. | Viscosity (P) 65° C. | Tensile Properties YM (MPa) | Tensile Properties Elongation (%) | Tensile Properties TS (MPa) | Tear Strength (J/m$^2$) | Film Tg (° C.) |
|---|---|---|---|---|---|---|---|---|---|
| BY21 | P1380-65 | w/o monomer | 225.9 | 26.43 | 0.67 ± 0.01 | 142 ± 29.9 | 0.41 ± 0.06 | 37 ± 3 | −53.8 |
| BY22 | P1380-67 | w/o monomer | 192.6 | 23.1 | 0.72 ± 0.01 | 137 ± 19.3 | 0.43 ± 0.04 | 35 ± 3 | −57.1 |

Figure 5:
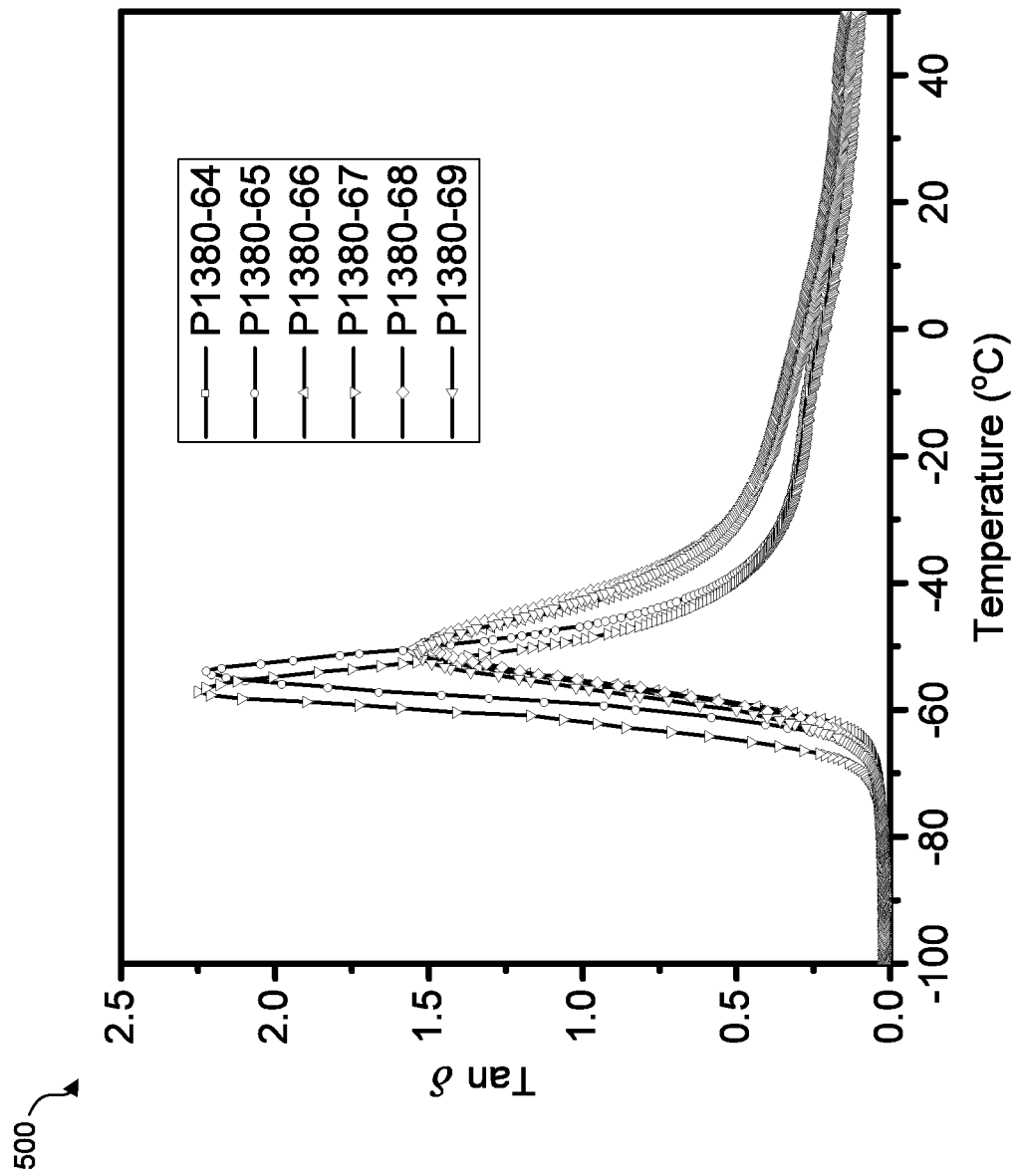
FIG. 5 is a graph of a dynamic mechanical analysis results for coatings according to various embodiments.

FIG. 5 show a graph 500 of a dynamic mechanical analysis results for cured polymer compositions in Table 2. Graph 500 is a plot of tan delta (tan δ) vs. temperature. The maximum value of tan δ for a cured polymer composition is the polymer's glass transition temperature. Glass transition temperatures of less than −50° C. typically result in excellent low temperature microbending performance for an optical fiber coating.

EXAMPLES

All raw materials used in the oligomer synthesis are the same except for the diisocyanates. The synthesis reactions are bulk reaction with no solvents and no purification step. All raw materials used in the monomer synthesis are the same except for the alcohols. The synthesis reactions are bulk reaction with no solvents and no purification step. The following commercially available materials were purchased: 2,6-di-t-butyl-4-methylphenol (BHT); dibutyltin dilaurate (DBTDL); 4,4'-Methylene bis(cyclohexyl) isocyanate (H12MDI); Isophorone diisocyanate (IPDI); were purchased from Sigma Aldrich, 2-isocyanatoethyl acrylate (IEA) was purchased from Showa Denko, Poly(propylene glycol) (PPG; PPG4000—Acclaim Polyol 4200) was purchased from Covestro, and nonylphenol ethoxylated (4) alcohol (NP4EO) was purchased from Miwon.

Example 1

Synthesis of Oligomer BY17—Molar Ratio=2/4 (H12MDI/PPG4000)

To a 500 mL reaction kettle equipped with a thermometer, Drierite drying tube, overhead stirrer, were added 7.69 g (0.0293 mol) of 4,4'-methylene bis(cyclohexyl) isocyanate (H12MDI), 100 mg 2,6-di-t-butyl-4-methylphenol (BHT) and 40 mg dibutyltin dilaurate (DBTDL) first, followed by addition of 234.04 g (0.0586 mol) of poly(propylene glycol) having an $M_n$ of about 4000 g/mol (PPG4000) while continuously stirring the contents in the kettle. After the addition of PPG4000, the reaction mixture was heated in an oil bath at 72-76° C. for about 1-1.5 h. At various internals, samples of the reaction mixture were retrieved for analysis by ATR-IR to monitor the progress of the reaction by determining the concentration of unreacted isocyanate groups based on the intensity of a characteristic isocyanate stretching mode centered at 2265 cm$^{-1}$. The first step was deemed complete when the IR absorbance of the unreacted isocyanate was ≤0.005. The kettle was removed from the oil bath and the reaction mixture was allowed to cool below 70° C. The addition of 8.27 g (0.0586 mol) of 2-isocyanatoethyl acrylate (IEA) was conducted dropwise over a period of 2-5 min using a pipette. After the addition of IEA, the kettle was returned to the oil bath and heated at about 72-76° C. for about 1.5 h. ATR-IR analysis of the samples at various intervals were conducted until all of the isocyanate group was reacted as evidenced by a decrease in the intensity of a characteristic isocyanate stretching peak centered at about 2265 cm$^{-1}$ from IR spectrum.

Example 2

Synthesis of Oligomer BY19—Molar Ratio=2/4 (IPDI/PPG4000)

To a 500 mL reaction kettle equipped with a thermometer, Drierite drying tube, overhead stirrer, were added 6.55 g (0.0295 mol) of isophorone diisocyanate (IPDI), 100 mg 2,6-di-t-butyl-4-methylphenol (BHT) and 40 mg dibutyltin dilaurate (DBTDL) first, followed by addition of 235.14 g (0.0589 mol) of poly(propylene glycol) having an $M_n$ of about 4000 g/mol (PPG4000) while continuously stirring the contents in the kettle. After the addition of PPG4000, the reaction mixture was heated in an oil bath at 72-76° C. for about 1-1.5 h. At various internals, samples of the reaction mixture were retrieved for analysis by ATR-IR to monitor the progress of the reaction by determining the concentration of unreacted isocyanate groups based on the intensity of a characteristic isocyanate stretching mode centered at 2265 cm$^{-1}$. The first step was deemed complete when the IR absorbance of the unreacted isocyanate was ≤0.005. The kettle was removed from the oil bath and the reaction mixture was allowed to cool below 70° C. The addition of 8.31 g (0.0589 mol) of 2-isocyanatoethyl acrylate (IEA) was conducted dropwise over a period of 2-5 min using a pipette. After the addition of IEA, the kettle was returned to the oil bath and heated at about 72-76° C. for about 1.5 h. ATR-IR analysis of the samples at various intervals were conducted until all of the isocyanate group was reacted as evidenced by a decrease in the intensity of a characteristic isocyanate stretching peak centered at about 2265 cm$^{-1}$ from IR spectrum.

Example 3

Synthesis of Oligomer BY21—Molar Ratio=2/3.4 (H12MDI/PPG4000)

To a 500 mL reaction kettle equipped with a thermometer, Drierite drying tube, overhead stirrer, were added 9.05 g (0.0345 mol) of 4,4'-methylene bis(cyclohexyl) isocyanate (H12MDI), 100 mg 2,6-di-t-butyl-4-methylphenol (BHT) and 40 mg dibutyltin dilaurate (DBTDL) first, followed by addition of 234.13 g (0.0586 mol) of poly(propylene glycol) having an Mn of about 4000 g/mol (PPG4000) while continuously stirring the contents in the kettle. After the addition of PPG4000, the reaction mixture was heated in an oil bath at 72-76° C. for about 1-1.5 h. At various internals, samples of the reaction mixture were retrieved for analysis by ATR-IR to monitor the progress of the reaction by determining the concentration of unreacted isocyanate groups based on the intensity of a characteristic isocyanate stretching mode centered at 2265 cm$^{-1}$. The first step was deemed complete when the IR absorbance of the unreacted isocyanate was ≤0.005. The kettle was removed from the oil bath and the reaction mixture was allowed to cool below 70° C. The addition of 6.82 g (0.0483 mol) of 2-isocyanatoethyl acrylate (IEA) was conducted by dropwise over a period of 2-5 min using a pipette. After the addition of IEA, the kettle was returned to the oil bath and heated at about 72-76° C. for about 1.5 h. ATR-IR analysis of the samples at various intervals were conducted until all of the isocyanate group was reacted as evidenced by a decrease in the intensity of a characteristic isocyanate stretching peak centered at about 2265 cm$^{-1}$ from IR spectrum.

Example 4

Synthesis of Oligomer BY22—Molar Ratio=2/3.4 (IPDI/PPG4000)

To a 500 mL reaction kettle equipped with a thermometer, Drierite drying tube, overhead stirrer, were added 7.71 g (0.0347 mol) of Isophorone diisocyanate (IPDI), 100 mg 2,6-di-t-butyl-4-methylphenol (BHT) and 40 mg dibutyltin dilaurate (DBTDL) first, followed by addition of 235.44 g (0.0590 mol) of poly(propylene glycol) having an $M_n$ of about 4000 g/mol (PPG4000) while continuously stirring the contents in the kettle. After the addition of PPG4000, the reaction mixture was heated in an oil bath at 72-76° C. for about 1-1.5 h. At various internals, samples of the reaction mixture were retrieved for analysis by ATR-IR to monitor the progress of the reaction by determining the concentration of unreacted isocyanate groups based on the intensity of a characteristic isocyanate stretching mode centered at 2265 cm$^{-1}$. The first step was deemed complete when the IR absorbance of the unreacted isocyanate was ≤0.005. The kettle was removed from the oil bath and the reaction mixture was allowed to cool below 70° C. The addition of 8.31 g (0.0485 mol) of 2-isocyanatoethyl acrylate (IEA) was conducted by dropwise over a period of 2-5 min using a pipette. After the addition of IEA, the kettle was returned to the oil bath and heated at about 72-76° C. for about 1.5 h. ATR-IR analysis of the samples at various intervals were conducted until all of the isocyanate group was reacted as evidenced by a decrease in the intensity of a characteristic isocyanate stretching peak centered at about 2265 cm$^{-1}$ from IR spectrum.

Example 5

Synthesis of Urethane Monomer 1 (NP4EO-IEA)

To a 500 mL reaction kettle equipped with a thermometer, Drierite drying tube, overhead stirrer, were added 100 mg 2,6-di-t-butyl-4-methylphenol (BHT) and 40 mg dibutyltin dilaurate (DBTDL) first, followed by addition of 184.36 g (0.465 mol) of nonylphenol ethoxylated (4) alcohol while continuously stirring the contents in the kettle. After the addition, the mixture was heated to approximately 60° C. Then 65.46 g (0.465 mol) of 2-isocyanatoethyl acrylate (IEA) was added. The mixture was heated at approximately 72-75° C. for 90 min, at which point the synthesis of urethane acrylate monomer (NP4EO-IEA) was complete as evidenced by a decrease in the intensity of a characteristic isocyanate stretching peak centered at about 2265 cm$^{-1}$ from IR spectrum.

Example 6

Coating Formulation Procedures

Primary coating compositions were formulated using a high-speed mixer in an appropriate container heated to about 60° C., with a heating band or heating mantle. In each case, the components were weighted into the container using a balance and allowed to mix until all the solid components were thoroughly dissolved and the mixture appeared homogeneous. Curable primary coatings are formulated such that the amounts of oligomer, monomer, and photo-initiator total of 100 wt %; other additives are added to the total mixture in units of pph. Oligomeric materials BY17, BY19, BY21, and BY 22 were separately combined with other components to form coating compositions. The amount of each component in the coating composition is listed in Table 1.

Aspect 1 of the description is:
A coated optical fiber, comprising:
    an optical fiber comprising a core and a cladding; and
    a coating disposed over the cladding, the coating comprising a cured product of a curable coating composition, the curable coating composition comprising an oligomer having the following structure:

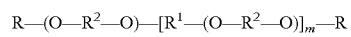

wherein:
each R is independently selected from the following:

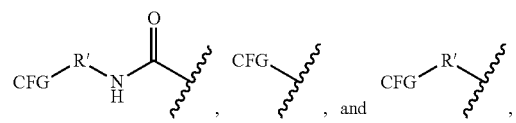

where CFG represents a curable functional group and R' is a divalent organic group;

each $R^1$ is independently selected from the following:

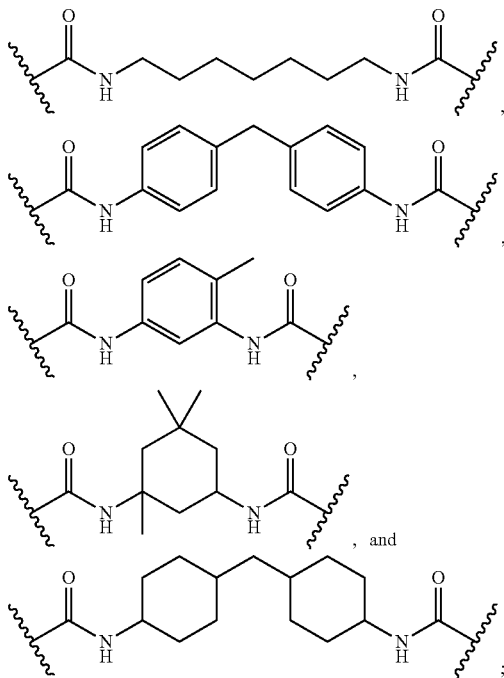

each O—$R^2$—O is independently the residue of a compound HO—$R^2$—OH selected from the group consisting of a polyether polyol, a polypropylene polyol, a polybutadiene polyol, a polycarbonate polyol, a polycaprolactone polyol, an acrylic polyol, and a silicone polyol; and m is greater than 0 and less than 5.

Aspect 2 of the description is:
The coated optical fiber of Aspect 1, wherein CFG is an ethylenically unsaturated group and R' is a linear or branched organic group with one or more alkylene linkages, ether linkages, ester linkages, amine linkages, or amide linkages.

Aspect 3 of the description is:
The coated optical fiber of Aspect 1, wherein CFG is an acrylate or methacrylate group.

Aspect 4 of the description is:
The coated optical fiber of any of Aspects 1-3, wherein each R is independently selected from the following:

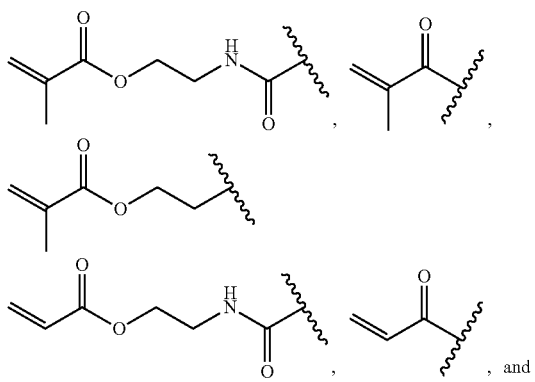

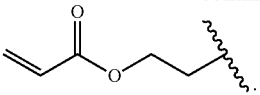

Aspect 5 of the description is:
The coated optical fiber of any of Aspects 1-4, wherein $R^2$ has the structure —$R^7$—(O—$R^7$)$_x$— where $R^7$ is a divalent organic group and x is an integer greater than 10.

Aspect 6 of the description is:
The coated optical fiber of any of Aspects 1-5, wherein the coating is a primary coating and the coated optical fiber comprises a secondary coating disposed over the primary coating.

Aspect 7 of the description is:
The coating optical fiber of any of Aspects 1-6, wherein m is greater than 0 and less than 3.

Aspect 8 of the description is:
The coated optical fiber of any of Aspects 1-7, wherein the coating comprises a tear strength of 20 J/m$^2$ or more.

Aspect 9 of the description is:
The coated optical fiber of any of Aspects 1-7, wherein the coating comprises a tear strength in a range of 20 J/m$^2$ to 55 J/m$^2$.

Aspect 10 of the description is:
The coated optical fiber of any of Aspects 1-7, wherein the coating comprising a tear strength in a range of 30 J/m$^2$ to 55 J/m$^2$.

Aspect 11 of the description is:
The coated optical fiber of any of Aspects 1-10, wherein the coating comprises a glass transition temperature of −45° C. or less.

Aspect 12 of the description is:
The coated optical fiber of any of Aspects 1-10, wherein the coating comprises a glass transition temperature in a range of −45° C. to −60° C.

Aspect 13 of the description is:
The coated optical fiber of any of Aspects 1-12, wherein the coating comprises a Young's modulus of 1 MPa or less.

Aspect 14 of the description is:
The coated optical fiber of any of Aspects 1-12, wherein the coating comprises a Young's modulus in a range of 0.1 MPa to 1 MPa.

Aspect 15 of the description is:
The coated optical fiber of any of Aspects 1-12, wherein the coating comprises a Young's modulus of 0.6 MPa or less.

Aspect 16 of the description is:
The coated optical fiber of any of Aspects 1-15, wherein the coating comprises a tensile strength of 0.25 MPa or more.

Aspect 17 of the description is:
The coated optical fiber of any of Aspects 1-16, wherein the coating comprises a percent elongation of 100% or more.

Aspect 18 of the description is:
The coated optical fiber of any of Aspects 1-16, wherein the coating comprises a percent elongation of 150% or more.

Aspect 19 of the description is:
The coated optical fiber of any of Aspects 1-16, wherein the coating comprises a percent elongation in a range of 100% to 200%.

Aspect 20 of the description is:
The coated optical fiber of any of Aspects 1-19, wherein the coating composition further comprises a photo initiator.

Aspect 21 of the description is:

The coated optical fiber of any of Aspects 1-20, wherein the coating composition further comprises one or more monomers having the following structure:

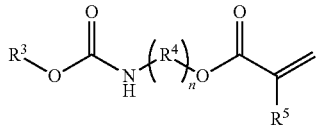

wherein:

$R^3$ is selected from the group consisting of: a linear or branched aliphatic monovalent radical optionally interrupted by one or more oxygen atoms, aryl, or aralkyl;

$R^4$ is selected from the group consisting of: a linear or branched aliphatic divalent radical, a branch aliphatic divalent radical optionally interrupted by one or more oxygen atoms, aryl, or aralkyl;

$R^5$ is selected from hydrogen or alkyl; and n is greater than or equal to 1 and less than or equal to 10.

Aspect 22 of the description is:

A curable composition for coating an optical fiber, the composition comprising:

an oligomer having the following structure:

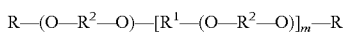

wherein;

each R is independently selected from the following:

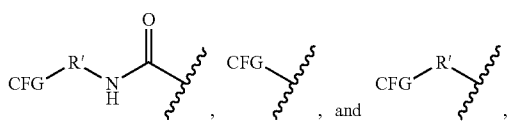

where CFG represents a curable functional group and R' is a divalent organic group;

each R is independently selected from the following:

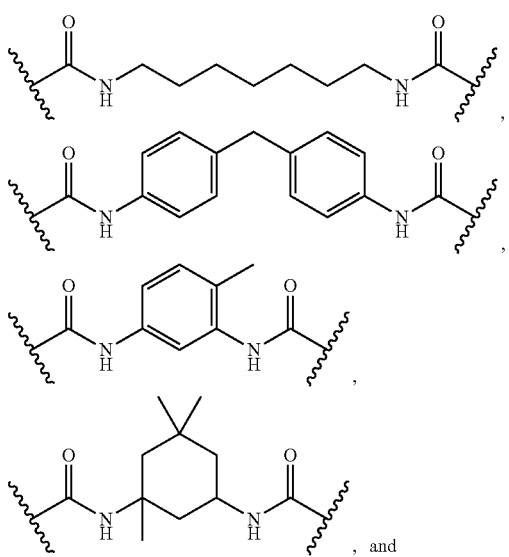

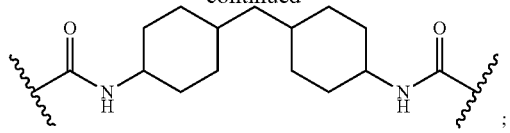

each $O-R^2-O$ is independently the residue of a compound $HO-R^2-OH$ selected from the group consisting of a polyether polyol, a polypropylene polyol, a polybutadiene polyol, a polycarbonate polyol, a polycaprolactone polyol, an acrylic polyol, and a silicone polyol; and m is greater than 0 and less than 5.

Aspect 23 of the description is:

The curable composition of Aspect 22, wherein CFG is an ethylenically unsaturated group and R' is a linear or branched organic group with one or more alkylene linkages, ether linkages, ester linkages, amine linkages, or amide linkages.

Aspect 24 of the description is:

The curable composition of Aspect 22, wherein CFG is an acrylate or methacrylate group.

Aspect 25 of the description is:

The curable composition of any of Aspects 22-24, further comprising a monomer having the following structure:

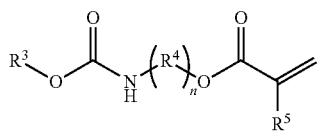

wherein:

$R^3$ is selected from the group consisting of: a linear or branched aliphatic monovalent radical optionally interrupted by one or more oxygen atoms, aryl, or aralkyl;

$R^4$ is selected from the group consisting of: a linear or branched aliphatic divalent radical, a branch aliphatic divalent radical optionally interrupted by one or more oxygen atoms, aryl, or aralkyl;

$R^5$ is selected from hydrogen or alkyl; and n is greater than or equal to 1 and less than or equal to 10.

Aspect 26 of the description is:

The curable composition of any of Aspects 22-25, further comprising a photoinitiator.

Aspect 27 of the description is:

The curable composition of any of Aspects 22-26, wherein $R^2$ has the structure $-R^7-(O-R^7)_x-$ where $R^7$ is a divalent organic group and x is an integer greater than 10.

Aspect 28 of the description is:

The curable composition of any of Aspects 22-27, further comprising a urethane diacrylate compound comprising $O-R^2-O$.

Aspect 29 of the description is:

The curable composition of Aspect 28, wherein a wt % of the urethane diacrylate compound in the curable composition is 5% or more.

Aspect 30 of the description is:

The curable composition of Aspect 28 or 29, wherein the urethane diacrylate compound has the structure $R-O-R^2-O-R$ and CFG is an acrylate group.

Aspect 31 of the description is:
A method for making an oligomer, the method comprising:
reacting a polyol with a diisocyanate compound to form a pre-oligomer compound comprising an internal urethane linkage and terminal OH groups; and
reacting the pre-oligomer compound with a capping compound comprising a curable functional group and a non-curable functional group, the non-curable functional group reacting with the terminal OH groups of the pre-oligomer compound to form the oligomer, the oligomer having terminal functional groups comprising the curable functional group.

Aspect 32 of the description is:
The method of Aspect 31, wherein the curable functional group is an ethylenically unsaturated group.

Aspect 33 of the description is:
The method of Aspect 31, wherein the curable functional group is an acrylate group or a methacrylate group.

Aspect 34 of the description is:
The method of any of Aspects 31-33, wherein the non-curable functional group is an isocyanate group.

Aspect 35 of the description is:
The method of any of Aspects 31-34, wherein the oligomer has the following structure:

$$R-(O-R^2-O)-[R^1-(O-R^2-O)]_m-R$$

wherein:
each R is independently selected from the following:

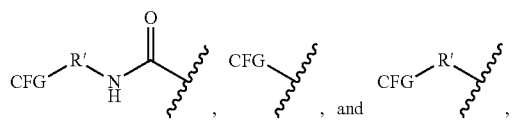
, and where CFG represents the curable functional group and W is a divalent organic group;
each $R^1$ is independently selected from the following:

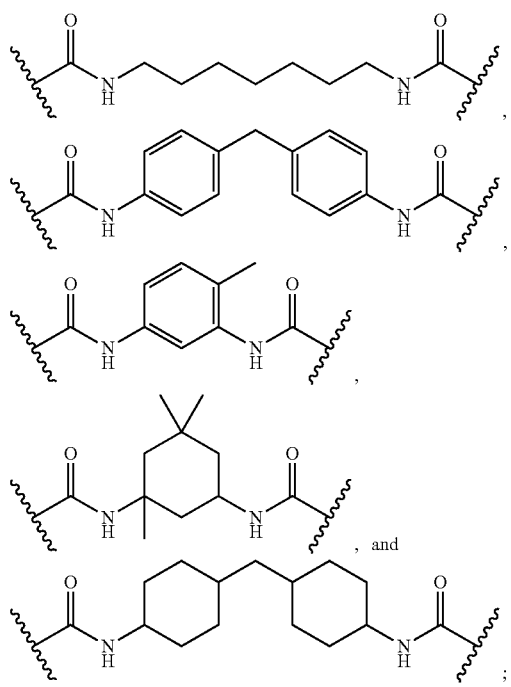

each $O-R^2-O$ is independently the residue of a compound $HO-R^2-OH$ selected from the group consisting of a polyether polyol, a polypropylene polyol, a polybutadiene polyol, a polycarbonate polyol, a polycaprolactone polyol, an acrylic polyol, and a silicone polyol; and
m is greater than 0 and less than 5.

Aspect 36 of the description is:
The method of Aspect 35, wherein $R^2$ has the structure $-R^7-(O-R^7)_x-$ where $R^7$ is a divalent organic group and x is an integer greater than 10.

Aspect 37 of the description is:
The method of Aspect 35 or 36, further comprising reaction of the polyol with the capping compound.

Aspect 38 of the description is:
The method of Aspect 37, wherein the reaction of the polyol with the capping compound forms a urethane diacrylate compound, the urethane diacrylate compound having the structure $R-O-R^2-O-R$ and wherein CFG is an acrylate group.

Aspect 39 of the description is:
The method of any of Aspects 31-38, wherein m is greater than 0 and less than 3.

Aspect 40 of the description is:
The method of any of Aspects 31-39, wherein the polyol has a molecular weight in a range of 1000 g/mol to 8000 g/mol.

Aspect 41 of the description is:
The method of any of Aspects 31-40, wherein the polyol is polypropylene glycol.

Aspect 42 of the description is:
The method of any of Aspects 31-41, wherein a molar ratio of the diisocyanate compound to the polyol is 0.7 or less.

Aspect 43 of the description is:
The method of any of Aspects 31-41, wherein a molar ratio of the diisocyanate compound to the polyol is in a range of 0.25 to 0.7.

While various embodiments have been described herein, they have been presented by way of example, and not limitation. It should be apparent that adaptations and modifications are intended to be within the meaning and range of equivalents of the disclosed embodiments, based on the teaching and guidance presented herein. It therefore will be apparent to one skilled in the art that various changes in form and detail can be made to the embodiments disclosed herein without departing from the spirit and scope of the present disclosure. The elements of the embodiments presented herein are not necessarily mutually exclusive, but may be interchanged to meet various situations as would be appreciated by one of skill in the art.

Embodiments of the present disclosure are described in detail herein with reference to embodiments thereof as illustrated in the accompanying drawings, in which like reference numerals are used to indicate identical or functionally similar elements. References to "one embodiment," "an embodiment," "some embodiments," "in certain embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The examples are illustrative, but not limiting, of the present disclosure. Other suitable modifications and adaptations of the variety of conditions and parameters normally encountered in the field, and which would be apparent to those skilled in the art, are within the spirit and scope of the disclosure.

The term "or," as used herein, is inclusive; more specifically, the phrase "A or B" means "A, B, or both A and B." Exclusive "or" is designated herein by terms such as "either A or B" and "one of A or B," for example.

The indefinite articles "a" and "an" to describe an element or component means that one or at least one of these elements or components is present. Although these articles are conventionally employed to signify that the modified noun is a singular noun, as used herein the articles "a" and "an" also include the plural, unless otherwise stated in specific instances. Similarly, the definite article "the," as used herein, also signifies that the modified noun may be singular or plural, again unless otherwise stated in specific instances.

As used in the claims, "comprising" is an open-ended transitional phrase. A list of elements following the transitional phrase "comprising" is a non-exclusive list, such that elements in addition to those specifically recited in the list may also be present. As used in the claims, "consisting essentially of" or "composed essentially of" limits the composition of a material to the specified materials and those that do not materially affect the basic and novel characteristic(s) of the material. As used in the claims, "consisting of" or "composed entirely of" limits the composition of a material to the specified materials and excludes any material not specified.

"Include," "includes," or like terms means encompassing but not limited to, that is, inclusive and not exclusive.

The term "wherein" is used as an open-ended transitional phrase, to introduce a recitation of a series of characteristics of the structure.

Where a range of numerical values is recited herein, comprising upper and lower values, unless otherwise stated in specific circumstances, the range is intended to include the endpoints thereof, and all integers and fractions within the range. It is not intended that the scope of the claims be limited to the specific values recited when defining a range. Further, when an amount, concentration, or other value or parameter is given as a range, one or more preferred ranges or a list of upper preferable values and lower preferable values, this is to be understood as specifically disclosing all ranges formed from any pair of any upper range limit or preferred value and any lower range limit or preferred value, regardless of whether such pairs are separately disclosed. Finally, when the term "about" is used in describing a value or an end-point of a range, the disclosure should be understood to include the specific value or end-point referred to. Whether or not a numerical value or end-point of a range recites "about," the numerical value or end-point of a range is intended to include two embodiments: one modified by "about," and one not modified by "about."

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. The term "about" refers to a value that is within±10% of the value stated. For example, about 3 wt % can include any number between 2.7 wt % and 3.3 wt %.

The term "about" references all terms in the range unless otherwise stated. For example, about 1, 2, or 3 is equivalent to about 1, about 2, or about 3, and further comprises from about 1-3, from about 1-2, and from about 2-3. Specific and preferred values disclosed for compositions, components, ingredients, additives, and like aspects, and ranges thereof, are for illustration only; they do not exclude other defined values or other values within defined ranges. The compositions and methods of the disclosure include those having any value or any combination of the values, specific values, more specific values, and preferred values described herein.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

The present embodiment(s) have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

It is to be understood that the phraseology or terminology used herein is for the purpose of description and not of limitation. The breadth and scope of the present disclosure should not be limited by any of the above-described exemplary embodiments, but should be defined in accordance with the following claims and their equivalents.

The breadth and scope of the present invention should not be limited by any of the above-described exemplary embodiments, but should be defined only in accordance with the following claims and their equivalents.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, the Examiner is also reminded that any disclaimer made in the instant application should not be read into or against the parent application.

What is claimed is:

1. A coated optical fiber, comprising:
   an optical fiber comprising a core and a cladding; and
   a coating disposed over the cladding, the coating comprising a cured product of a curable coating composition, the curable coating composition comprising an oligomer having the following structure:

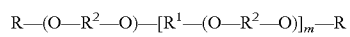

wherein:
   each R is independently selected from the following:

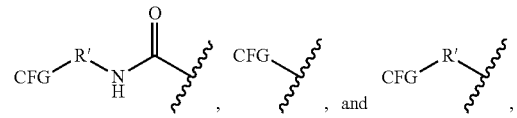

where CFG represents a curable functional group and R' is a divalent organic group;

each $R^1$ is independently selected from the following:

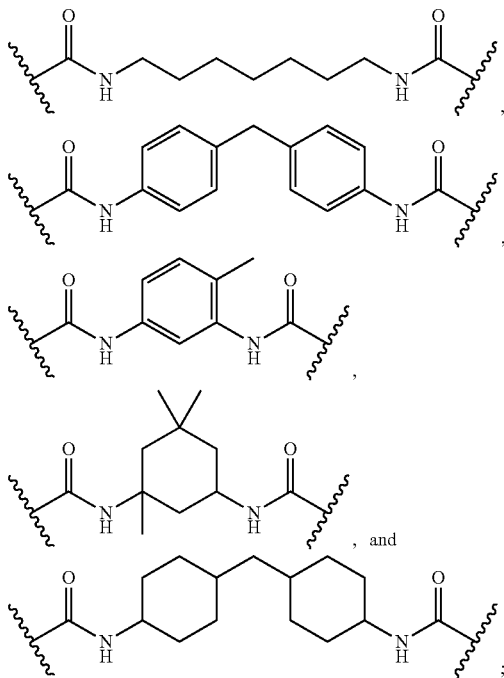

each O—$R^2$—O is independently the residue of a compound HO—$R^2$—OH selected from the group consisting of a polyether polyol, a polypropylene polyol, a polybutadiene polyol, a polycarbonate polyol, a polycaprolactone polyol, an acrylic polyol, and a silicone polyol;

$R^2$ has the structure —$R^7$—(—O—$R^7$)$_x$—where $R^7$ is a divalent organic group and x is an integer greater than 10; and m is greater than 0 and less than 5.

2. The coated optical fiber of claim 1, wherein CFG is an ethylenically unsaturated group and R' is a linear or branched organic group with one or more alkylene linkages, ether linkages, ester linkages, amine linkages, or amide linkages.

3. The coated optical fiber of claim 1, wherein each R is independently selected from the following:

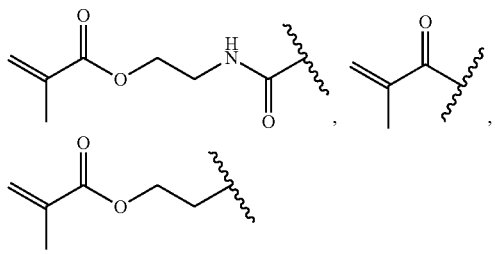

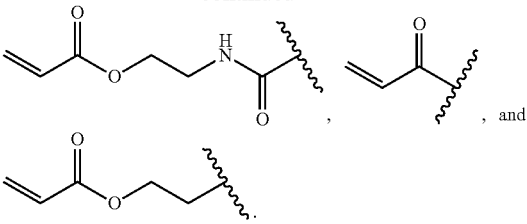

4. The coating optical fiber of claim 1, wherein m is greater than 0 and less than 3.

5. The coated optical fiber of claim 1, wherein the coating comprising a tear strength in a range of 30 J/m$^2$ to 55 J/m$^2$.

6. The coated optical fiber of claim 1, wherein the coating comprises a glass transition temperature of −45° C. or less.

7. The coated optical fiber of claim 1, wherein the coating comprises a Young's modulus of 0.6 MPa or less.

8. The coated optical fiber of claim 1, wherein the coating comprises a tensile strength of 0.25 MPa or more.

9. The coated optical fiber of claim 1, wherein the coating comprises a percent elongation of 100% or more.

10. The coated optical fiber of claim 1, wherein the coating composition further comprises a photoinitiator.

11. The coated optical fiber of claim 1, wherein the coating composition further comprises one or more monomers having the following structure:

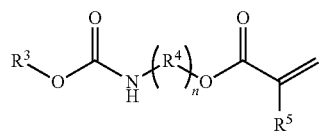

wherein:
$R^3$ is selected from the group consisting of: a linear or branched aliphatic monovalent radical optionally interrupted by one or more oxygen atoms, aryl, or aralkyl;
$R^4$ is selected from the group consisting of: a linear or branched aliphatic divalent radical, a branch aliphatic divalent radical optionally interrupted by one or more oxygen atoms, aryl, or aralkyl;
$R^5$ is selected from hydrogen or alkyl; and
n is greater than or equal to 1 and less than or equal to 10.

12. The curable composition of claim 1, further comprising a urethane diacrylate compound comprising O—$R^2$—O, wherein $R^2$ has the structure —$R^7$—(O—$R^7$)$_x$—where $R^7$ is a divalent organic group and x is an integer greater than 10.

13. The curable composition of claim 12, wherein a wt % of the urethane diacrylate compound in the curable composition is 5% or more.

14. The curable composition of claim 12, wherein the urethane diacrylate compound has the structure R—O—$R^2$—O—R and CFG is an acrylate group.

* * * * *

UNITED STATES PATENT AND TRADEMARK OFFICE
CERTIFICATE OF CORRECTION

PATENT NO. : 11,822,117 B2
APPLICATION NO. : 17/060307
DATED : November 21, 2023
INVENTOR(S) : Dana Craig Bookbinder et al.

It is certified that error appears in the above-identified patent and that said Letters Patent is hereby corrected as shown below:

In the Claims

In Column 37, Line 36, in Claim 1, delete "—$R^7$—(—O—$R^7$)$_x$—" and insert -- -$R^7$-(O-$R^7$)$_x$- --.

In Column 38, Line 12, in Claim 4, delete "coating" and insert -- coated --.

Signed and Sealed this
Sixth Day of August, 2024

*Katherine Kelly Vidal*

Katherine Kelly Vidal
*Director of the United States Patent and Trademark Office*